US012803366B2

(12) United States Patent
Yoshioka

(10) Patent No.: US 12,803,366 B2
(45) Date of Patent: Nov. 17, 2026

(54) ELECTRIC MOTOR

(71) Applicant: Panasonic Intellectual Property Management Co., Ltd., Osaka (JP)

(72) Inventor: Yuuki Yoshioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 18/863,360

(22) PCT Filed: Mar. 22, 2023

(86) PCT No.: PCT/JP2023/011217

§ 371 (c)(1),
(2) Date: Nov. 6, 2024

(87) PCT Pub. No.: WO2023/223661

PCT Pub. Date: Nov. 23, 2023

(65) Prior Publication Data

US 2025/0300517 A1 Sep. 25, 2025

(30) Foreign Application Priority Data

May 17, 2022 (JP) ................................. 2022-080731

(51) Int. Cl.
*H01R 39/38* (2006.01)
*H02K 5/14* (2006.01)

(52) U.S. Cl.
CPC ........... *H02K 5/148* (2013.01); *H01R 39/381* (2013.01)

(58) Field of Classification Search
CPC ........ H01R 4/48; H01R 39/381; H01R 39/38; H02K 5/148; H02K 13/00
See application file for complete search history.

(56) References Cited

U.S. PATENT DOCUMENTS

2016/0118867 A1 4/2016 Iwata et al.

FOREIGN PATENT DOCUMENTS

| | | |
|---|---|---|
| CN | 201369484 | 12/2009 |
| CN | 201369484 Y | 12/2009 |
| JP | 05-029268 U | 4/1993 |
| JP | 2016-086489 | 5/2016 |

OTHER PUBLICATIONS

The EPC Office Action dated Aug. 6, 2025 for the related European Patent Application No. 23807276.3.
International Search Report of PCT application No. PCT/JP2023/011217 dated Jun. 6, 2023.

*Primary Examiner* — Terrance L Kenerly
(74) *Attorney, Agent, or Firm* — Rimon P.C.

(57) ABSTRACT

An electric motor includes a rotor including a rotating shaft extending in an axial direction, a commutator attached to the rotating shaft, a brush including a front end surface coming into contact with the commutator and a rear end surface positioned on a side opposite to the front end surface, a constant load spring including a first spiral portion and a second spiral portion each made of a strip-shaped wire material wound in a spiral shape, and including a fixed end on the front end surface side of the brush, and a pressing member coming into contact with the rear end surface of the brush to press the brush against the commutator with a load from the constant load spring.

16 Claims, 15 Drawing Sheets

ELECTRIC MOTOR

CROSS-REFERENCE TO RELATED APPLICATIONS

This application is a U.S. national stage application of the PCT International Application No. PCT/JP2023/011217 filed on Mar. 22, 2023, which claims the benefit of foreign priority of Japanese patent application No. 2022-080731 filed on May 17, 2022, the contents all of which are incorporated herein by reference.

TECHNICAL FIELD

The present disclosure relates to an electric motor.

BACKGROUND ART

Electric motors are widely used not only in the field of home electrical appliances such as vacuum cleaners, but also in the field of electric equipment, such as automobiles. For example, an electric motor is used in an electric air blower mounted on a vacuum cleaner to rotate a rotary fan. In a two-wheeled or four-wheeled vehicle, an electric motor is used to drive a cooling fan such as a radiator.

A brushed electric motor (commutator electric motor) using a brush and a brushless electric motor not using a brush have been known as the electric motor. The brushed electric motor includes a stator, a rotor that rotates by a magnetic force of the stator, a commutator attached to a rotating shaft of the rotor, and a brush in sliding contact with the commutator.

In the brushed electric motor, a brush spring is used to press the brush against the commutator. The brush spring applies pressure to the brush using spring elasticity. In related art, a coil spring or a torsion spring has been used as the brush spring of the brushed electric motor.

However, in the coil spring or the torsion spring, there is a large difference between a pressure (initial pressure) before the brush is worn and a pressure (final pressure) when the electric motor reaches the end of lifespan due to the wear of the brush. Therefore, in the coil spring or the torsion spring, it is necessary to set the initial pressure to be high in order to secure a predetermined final pressure or more. Thus, in an initial stage, friction between the brush and the commutator increases during rotation of the rotor, and a sliding loss of the brush may increase. This results in a decrease in efficiency of the electric motor and a decrease in lifespan of the electric motor (lifespan of the brush).

Therefore, in order to reduce the difference between the initial pressure and the final pressure and apply a uniform load (pressure) to the brush, a technique using a constant load spring as the brush spring has been proposed (for example, PTL 1). The constant load spring is a spiral spring having a spiral portion in which a wire material having a strip shape is spirally wound. The constant load spring is arranged such that the spiral portion comes into contact with a rear end surface of the brush. As a result, the constant load can be applied to the rear end surface of the brush by the spiral portion by using a force by which the spiral portion returns to an original state when the strip-shaped wire material is stretched from the spiral portion.

However, in the electric motor of the related art using the brush spring having the spiral portion, the spiral portion of the brush spring is arranged behind the rear end surface of the brush in a direction in which the brush moves. Therefore, in the electric motor of the related art, it is necessary to shorten a length of the brush by at least a dimension of the spiral portion. Thus, there is a problem that the lifespan of the electric motor is shortened.

CITATION LIST

Patent Literature

PTL 1: Unexamined Japanese Utility Model Publication No. H05-29268

SUMMARY

The present disclosure has been made to solve such a problem. An object of the present disclosure is to provide a long-lifespan electric motor.

In order to achieve the above object, an aspect of an electric motor according to the present disclosure includes a rotor including a rotating shaft extending in an axial direction, a commutator attached to the rotating shaft, a brush including a front end surface coming into contact with the commutator and a rear end surface positioned on a side opposite to the front end surface, a constant load spring including a first spiral portion and a second spiral portion each made of a strip-shaped wire material wound in a spiral shape, and including a fixed end on the front end surface side of the brush, and a pressing member coming into contact with the rear end surface of the brush to press the brush against the commutator with a load from the constant load spring.

Preferably, the pressing member has a first end and a second end that each protrude from the rear end surface of the brush when the brush is viewed from the axis in a direction opposite to a direction in which the brush is pressed against the commutator by the load from the constant load spring, and the brush is pressed against the commutator by a load generated when the strip-shaped wire material drawn out from the first spiral portion of the constant load spring returns to an original state is applied to the first end of the pressing member and a load generated when the strip-shaped wire material drawn out from the second spiral portion of the constant load spring returns to an original state is applied to the second end of the pressing member.

Preferably, the pressing member has the first end coming into contact with an inner surface of the first spiral portion of the constant load spring and the second end coming into contact with an inner surface of the second spiral portion of the constant load spring.

Preferably, the pressing member has the first end coming into contact with an outer surface of the first spiral portion of the constant load spring on the fixed end side of the constant load spring and the second end coming into contact with an outer surface of the second spiral portion of the constant load spring on the fixed end side of the constant load spring.

Preferably, each of the first spiral portion and the second spiral portion of the constant load spring comes into contact with the pressing member at one point in a section taken along a plane passing through an axis of the rotating shaft.

A sectional shape of the pressing member may be circular at a contact portion between the pressing member and each of the first spiral portion and the second spiral portion of the constant load spring.

Preferably, the rear end surface of the brush comes into contact with the pressing member at two points in a section taken along a plane passing through an axis of the rotating shaft.

A recess may be formed at a contact portion of the rear end surface of the brush with the pressing member, and the two points may be contact portions between the pressing member and an opening end edge of the recess in the section taken along the plane passing through the axis of the rotating shaft.

Preferably, the electric motor further includes a brush holder including a brush accommodation portion that accommodates the brush. A first slit extending along a longitudinal direction of the brush is formed on one side surface of the brush accommodation portion, a second slit extending along the longitudinal direction of the brush is formed on an other side surface of the brush accommodation portion, and the pressing member has the first end protruding from the first slit of the brush accommodation portion and the second end protruding from the second slit of the brush accommodation portion.

Preferably, the first spiral portion and the second spiral portion of the constant load spring are arranged to sandwich the brush accommodation portion.

Preferably, the constant load spring includes a coupling portion in which the strip-shaped wire material forming the first spiral portion and the strip-shaped wire material forming the second spiral portion are coupled, and the coupling portion is the fixed end of the constant load spring.

Preferably, the coupling portion of the constant load spring is fixed to the brush holder.

The pressing member may be a rod-shaped member including a linear elongated shape, the first end of the pressing member may be one end of the rod-shaped member in a longitudinal direction, and the second end of the pressing member may be an other end of the rod-shaped member in the longitudinal direction.

The pressing member may include a rod-shaped portion that includes a linear elongated shape, comes into contact with the rear end surface of the brush, and protrudes from the rear end surface, a first extending portion that extends from one end of the rod-shaped portion toward the commutator, and a second extending portion that extends from an other end of the rod-shaped portion toward the commutator, the first end of the pressing member may an end of the first extending portion, and the second end of the pressing member may an end of the second extending portion.

The rear end surface of the brush may have an arc shape when the brush is viewed from above. In the electric motor according to the present disclosure, since it is not necessary to shorten the brush even though the brush spring having the spiral portion is used, it is possible to realize the long-lifespan electric motor.

DESCRIPTION OF PREFERRED EMBODIMENTS

Hereinafter, exemplary embodiments of the present disclosure will be described with reference to the drawings. Note that, exemplary embodiments to be described below illustrate specific examples of the present disclosure. Therefore, numerical values, constituent elements, arrangement positions and connection modes of the constituent elements, steps, order of the steps, and the like illustrated in the following exemplary embodiment are merely examples, and are not intended to limit the present disclosure. Thus, among the constituent elements in the following exemplary embodiments, constituent elements that are not described in independent claims indicating the highest concept of the present disclosure are described as optional constituent elements.

In the present specification and the drawings, an X-axis, a Y-axis, and a Z-axis indicate three axes of a three-dimensional orthogonal coordinate system. The X-axis and the Y-axis are axes orthogonal to each other and both orthogonal to the Z-axis. In the present exemplary embodiment, a Z-axis direction is a direction in which axis C of rotating shaft 13 extends.

Note that, each of the drawings is a schematic diagram and not necessarily illustrated strictly. In each drawing, a substantially identical configuration to other drawing is denoted by the same reference sign and repetitive explanation thereof will be omitted or simplified. In the present specification, the terms "upper" and "lower" do not necessarily refer to an upward direction (vertically upward) and a downward direction (vertically downward) in terms of absolute space recognition.

First Exemplary Embodiment

Figure 1:
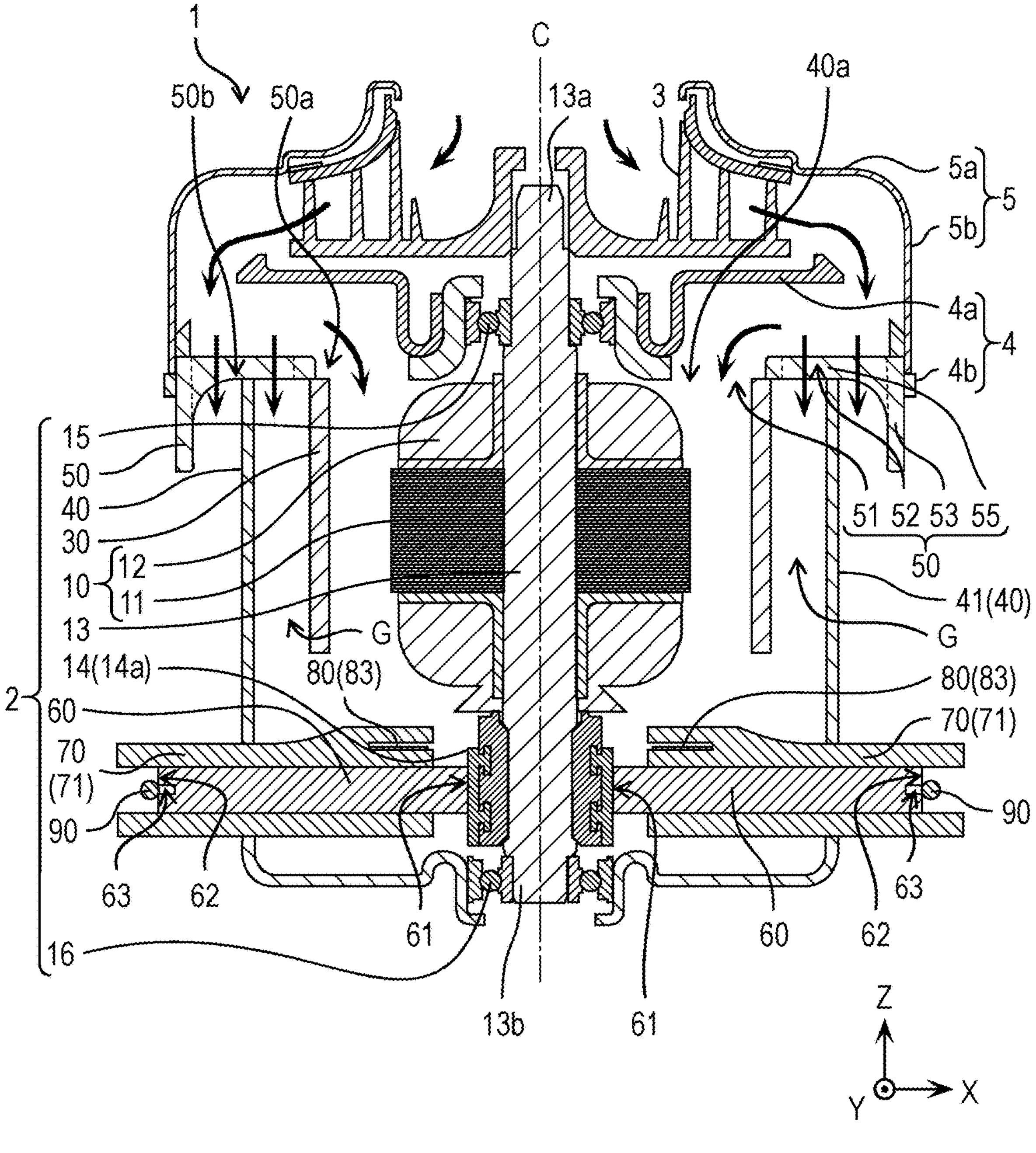
FIG. 1 is a sectional view of an electric air blower according to a first exemplary embodiment taken along a plane passing through an axis of a rotating shaft and passing through a pair of brushes.
Figure 2:
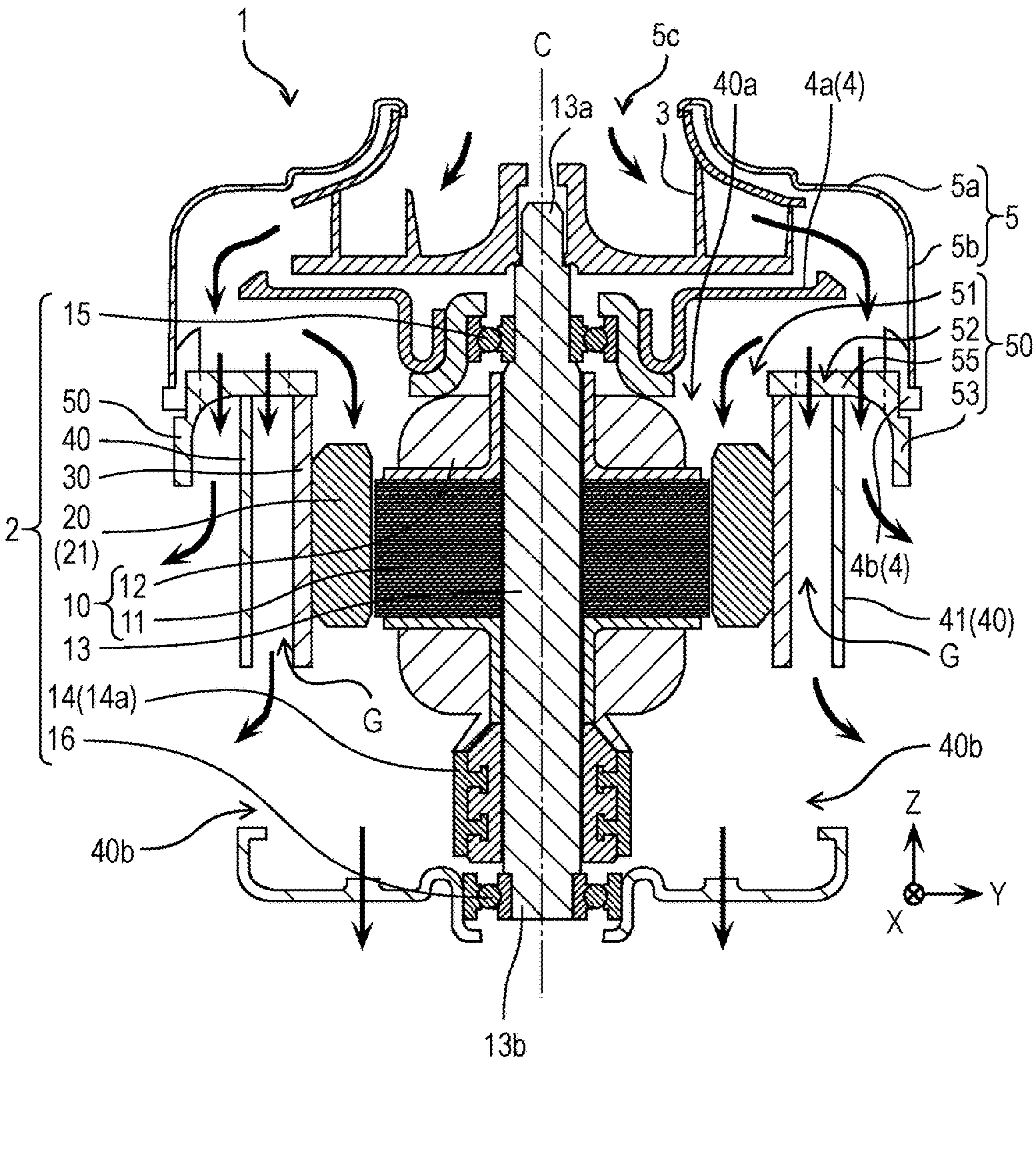
FIG. 2 is a sectional view of the electric air blower according to the first exemplary embodiment taken along a plane passing through the axis of the rotating shaft and passing through a pair of magnets as a stator.
Figure 3:
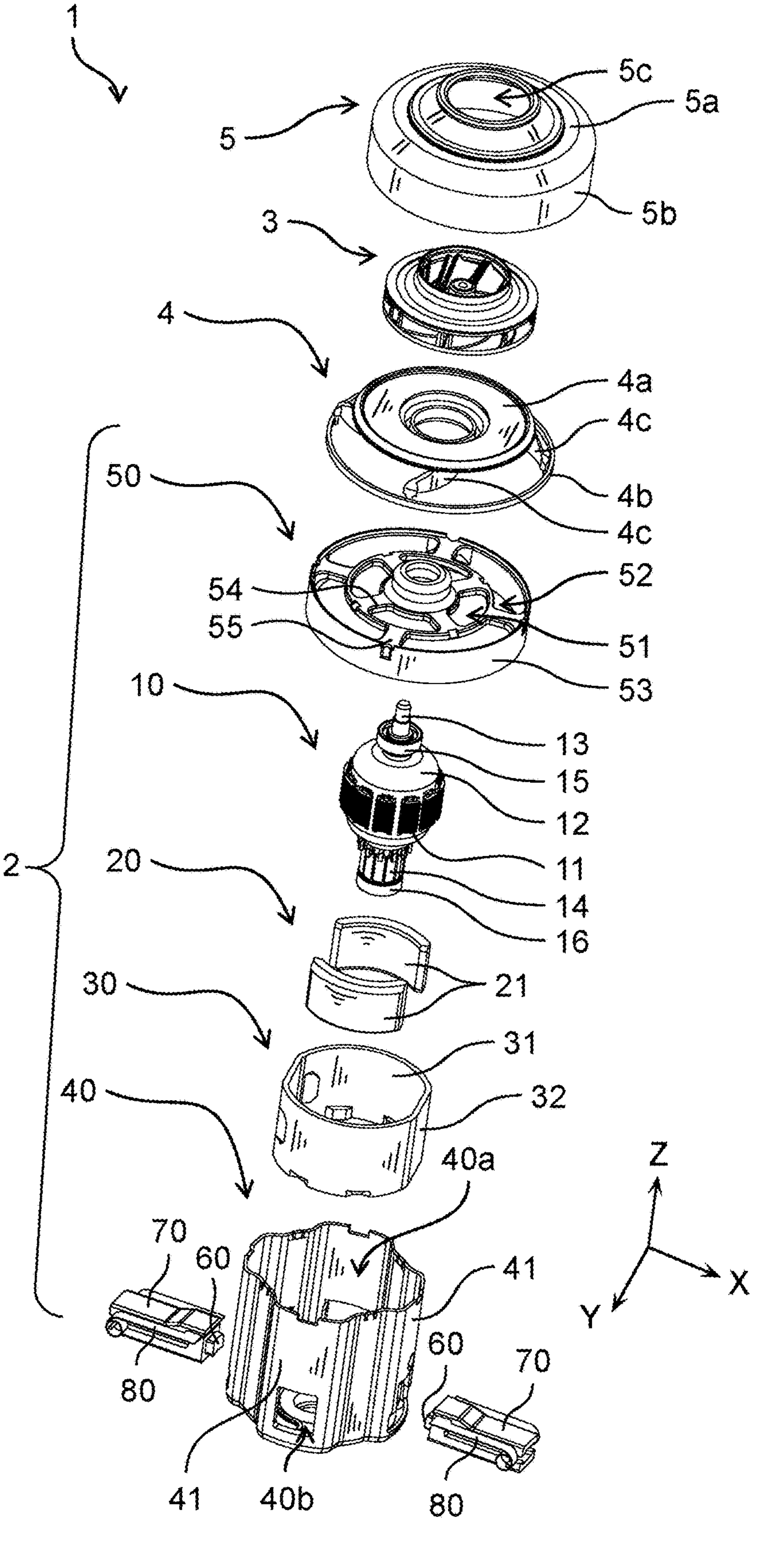
FIG. 3 is an exploded perspective view of the electric air blower according to the first exemplary embodiment.

An entire configuration of electric air blower 1 on which electric motor 2 according to a first exemplary embodiment is mounted will be described with reference to FIGS. 1 to 3. FIG. 1 is a sectional view (XZ sectional view) of electric air blower 1 according to the first exemplary embodiment taken along a plane passing through axis C of rotating shaft 13 and passing through a pair of brushes 60. FIG. 2 is a sectional view (YZ section) of electric air blower 1 according to the first exemplary embodiment taken along a plane passing through axis C of rotating shaft 13 and passing through a pair of magnets 21 as stators 20. In FIGS. 1 and 2, a flow of air flowing into electric air blower 1 when rotary fan 3 rotates is indicated by a thick arrow. FIG. 3 is an exploded perspective view of electric air blower 1 according to the first exemplary embodiment.

As illustrated in FIGS. 1 to 3, electric air blower 1 includes electric motor 2, rotary fan 3, air guide 4, and fan case 5. Electric motor 2 includes rotor 10 and stator 20. Rotary fan 3 is attached to rotating shaft 13 of electric motor 2. Air discharged from rotary fan 3 flows into air guide 4. Fan case 5 accommodates rotary fan 3. Electric air blower 1 is used, for example, in a vacuum cleaner.

Electric motor 2 is a fan motor that rotates rotary fan 3. As an example, electric motor 2 is a DC electric motor to which a DC power supply is input. Electric motor 2 is a commutator electric motor with a brush.

As illustrated in FIGS. 1 to 3, electric motor 2 includes rotor 10, stator 20, yoke 30, frame 40, bracket 50, brush 60, brush holder 70, constant load spring 80 that is a brush spring, and pressing member 90. Rotor 10, stator 20, and yoke 30 are arranged in frame 40. A detailed configuration of each member of electric motor 2 will be described below.

Rotary fan 3 sucks air into an outer shell (housing) including frame 40 and fan case 5. As an example, rotary fan 3 is a centrifugal fan that can obtain high suction pressure. Rotation of rotary fan 3 generates a wind pressure, air is sucked from inlet port 5*c* of fan case 5, and air is discharged from rotary fan 3. The air discharged from rotary fan 3 flows into air guide 4. Rotary fan 3 is made of, for example, a resin material or a metal material such as aluminum.

As an example, rotary fan 3 includes a first side plate provided with a suction port, a second side plate facing the first side plate across a predetermined gap, and a plurality of fan blades sandwiched between the first side plate and the second side plate. The plurality of fan blades each have a plate shape curved in an arc shape. The plurality of fan blades are arranged radially in such a way as to swirl.

Air guide 4 has a function of forming a flow path of an airflow. For example, air guide 4 commutates and discharges the air sucked from inlet port 5*c* of fan case 5 by the rotation of rotary fan 3. The air discharged from air guide 4 flows into frame 40 via bracket 50. The air discharged from air guide 4 is not only discharged to an inside of frame 40 but also discharged to an outside of frame 40 via bracket 50.

Air guide 4 includes main body 4*a*, ring shape part 4*b* having an annular shape and surrounding main body 4*a* with a gap from main body 4*a*, and a plurality of coupling plates 4*c* coupling main body 4*a* and ring shape part 4*b*. A gap between main body 4*a* and ring shape part 4*b* serves as a ventilation path.

Main body 4*a* is a disk body having a through hole for fixing to bracket 50. Ring shape part 4*b* functions as a support part that supports an end in the direction (thrust direction) axis C of rotating shaft 13 in side wall portion 5*b* of fan case 5 extends. Each of the plurality of coupling plates 4*c* functions as a guide plate for forming the flow path of the airflow. Specifically, the plurality of coupling plates 4*c* each have a plate shape curved in an arc shape. The plurality of coupling plates 4*c* are radially arranged in such a way as to swirl outward from the through hole of main body 4*a*. Air guide 4 is made of, for example, a resin material. However, air guide 4 may be made of a metallic material.

Fan case 5 is a housing that accommodates rotary fan 3. Fan case 5 is a cover that covers rotary fan 3 and air guide 4. As an example, fan case 5 is a metal cover made of a metallic material. However, fan case 5 may be a resin cover made of a resin material.

Fan case 5 has lid portion 5*a* that covers upper portions of rotary fan 3 and air guide 4, and side wall portion 5*b* that covers side portions of rotary fan 3 and air guide 4. Fan case 5 has inlet port 5*c* (suction port) for sucking outside air. Inlet port 5*c* is a circular through hole provided at the center of lid portion 5*a*.

Fan case 5 is fixed to bracket 50. Fan case 5 is fixed to bracket 50 via air guide 4. A fan case spacer having an opening corresponding to inlet port 5*c* may be attached to inlet port 5*c* of fan case 5.

In electric air blower 1 configured as described above, when rotor 10 included in electric motor 2 rotates, rotary fan 3 rotates, and air is sucked into fan case 5 from inlet port 5*c* of fan case 5. As a result, the air flows into rotary fan 3. The air sucked by rotary fan 3 is compressed to a high pressure by the fan blade included in rotary fan 3, and is discharged radially outer side from an outer peripheral side of rotary fan 3. The air discharged from rotary fan 3 flows into air guide 4 along side wall portion 5*b* of fan case 5, and reaches bracket 50 through the ventilation path of air guide 4.

Part of the air having reached bracket 50 flows into frame 40 via bracket 50, passes through inside frame 40, and is discharged to the outside from exhaust port 40*b* of frame 40. That is, the air flowing into frame 40 is discharged to an outside of electric air blower 1 while cooling heat generation components (such as winding) of electric motor 2.

On the other hand, another part of the air having reached bracket 50 is directly discharged to the outside of electric air blower 1 via bracket 50 without passing through the inside of frame 40. This enables the airflow to be discharged to the outside of electric air blower 1 without causing a loss due to passage through inside of frame 40.

Next, a detailed configuration of each member included in electric motor 2 will be described with reference to FIGS. 1 to 3.

As illustrated in FIGS. 1 and 2, rotor 10 of electric motor 2 is arranged with a minute air gap between rotor 10 and stator 20. Rotor 10 is an inner rotor. Rotor 10 is arranged inside stator 20. Rotor 10 includes rotating shaft 13. Rotor 10 rotates about axis C of rotating shaft 13 as a rotation center by a magnetic force generated by stator 20.

Rotor 10 generates a magnetic force acting on stator 20. Specifically, an orientation of a main magnetic flux generated by rotor 10 is a direction orthogonal to the direction in which axis C of rotating shaft 13 extends. Rotor 10 is an armature. Rotor 10 includes rotor core 11 attached to rotating shaft 13, winding coil 12 wound around rotor core 11, rotating shaft 13, and commutator 14. FIGS. 1 to 3 schematically illustrate winding coil 12.

Rotor core 11 is an armature core around which winding coil 12 is wound. Rotor core 11 is a laminate in which a plurality of electromagnetic steel sheets are laminated in the direction in which axis C of rotating shaft 13 extends. Rotor core 11 is not limited to the laminate of the electromagnetic steel plates. Rotor core 11 may be a bulk body made of a magnetic material.

Rotor core 11 has a plurality of teeth each protruding outward in a radial direction of rotating shaft 13. The plurality of teeth radially extend in a direction (radial direction) orthogonal to axis C of rotating shaft 13. The plurality of teeth are magnetic poles. The plurality of teeth generate a magnetic force acting on stator 20 by a current flowing through winding coil 12 wound around each tooth.

Winding coil 12 is wound around rotor core 11. Specifically, winding coil 12 is wound around the plurality of teeth of rotor core 11. Winding coil 12 may be wound around rotor core 11 via an insulator. Winding coil 12 is electrically connected to commutator segment 14*a* of commutator 14. The current flows through winding coil 12 via commutator 14, and thus, the magnetic force acting on stator 20 is generated in each tooth of rotor core 11.

Rotating shaft 13 is fixed to the center of rotor core 11. Rotating shaft 13 is a shaft including axis C. Rotating shaft 13 is a member having an elongated rod shape such as a metal rod. Axis C of rotating shaft 13 is a center when rotor 10 rotates. A longitudinal direction (extending direction) of rotating shaft 13 is a direction (axial direction) in which axis C extends.

Rotating shaft 13 is fixed to rotor core 11 in a state of penetrating rotor core 11 in such a way as to extend on both sides of rotor core 11 in the direction in which axis C of rotating shaft 13 extends. Specifically, rotating shaft 13 is inserted into a through hole provided at the center of rotor core 11 and is fixed to rotor core 11. Rotating shaft 13 is fixed to rotor core 11, for example, by being press-fitted or shrink-fitted into the through hole of rotor core 11.

Rotating shaft 13 is rotatably supported by first bearing 15 and second bearing 16. Specifically, first site 13*a* of rotating shaft 13 protruding to one side from rotor core 11 is supported by first bearing 15. Second site 13*b* of rotating shaft 13 protruding to the other side from rotor core 11 is supported by second bearing 16. As an example, first bearing 15 and second bearing 16 are bearings such as ball bearings. In this manner, rotating shaft 13 is supported by first bearing 15 and second bearing 16 in a rotatable state. First bearing 15 is fixed to bracket 50. Second bearing 16 is fixed to a bottom of frame 40. That is, bracket 50 is a first bracket. Frame 40 is a second bracket.

First site 13*a* of rotating shaft 13 protrudes from first bearing 15. A distal end of first site 13*a* of rotating shaft 13 protruding from first bearing 15 is attached to rotary fan 3.

Commutator 14 is attached to rotating shaft 13. Therefore, commutator 14 rotates together with rotating shaft 13. Commutator 14 is attached to second site 13*b* of rotating shaft 13. Specifically, commutator 14 is arranged between rotor core 11 and second bearing 16 on rotating shaft 13.

Commutator 14 includes a plurality of commutator segments 14*a* arrayed annularly in such a way as to surround rotating shaft 13. The plurality of commutator segments 14*a* are insulated and separated from one another in a rotation direction of rotating shaft 13. As described above, each of the plurality of commutator segments 14*a* is electrically connected to winding coil 12.

As illustrated in FIG. 2, stator 20 opposes rotor 10. Specifically, stator 20 opposes rotor core 11. Stator 20 is arranged on an outer peripheral side in a radial direction of rotor core 11. Stator 20 is a plurality of magnets 21 arranged at intervals over a circumferential direction of rotor 10. Magnet 21 is a field magnet that generates a magnetic flux for generating torque. Magnet 21 is, for example, a permanent magnet having an S pole and an N pole. The plurality of magnets 21 are arranged in such a way that N poles and S poles alternate along the rotation direction (circumferential direction) of rotating shaft 13.

Stator 20 includes two magnets 21 opposing each other via rotor 10. A minute air gap is present between an inner surface of each magnet 21 and an outer peripheral surface of rotor 10 (rotor core 11). Magnet 21 is fixed to yoke 30.

As illustrated in FIG. 2, yoke 30 surrounds magnet 21. Yoke 30 constitutes a magnetic circuit (field) together with magnet 21. Therefore, yoke 30 may be regarded as a part of stator 20. Yoke 30 has a tubular shape with a constant thickness. Yoke 30 surrounds entire rotor 10 and stator 20 (magnet 21). Yoke 30 is made of a magnetic material such as iron.

As illustrated in FIGS. 1 and 2, frame 40 is a housing (case) that accommodates components constituting electric motor 2, such as rotor 10 and stator 20. Frame 40 is an outer member (outer shell) of electric air blower 1 and electric motor 2. Frame 40 can be made of, for example, a metallic material such as aluminum.

As illustrated in FIGS. 2 and 3, a plurality of exhaust ports 40*b* for discharging the air sucked by the rotation of rotary fan 3 are provided in each of the side wall portion and the bottom of frame 40.

As illustrated in FIGS. 1 and 2, a plurality of gaps G serving as ventilation paths along the direction (rotation axis direction) in which axis C of rotating shaft 13 extends are formed between an outer surface of yoke 30 and an inner surface of frame 40. In the present exemplary embodiment, a plurality of gaps G are formed.

As illustrated in FIGS. 1 to 3, frame 40 has bulge 41 in which a part of the side wall portion of frame 40 bulges outward in a radial direction. Gap G is a space region between bulge 41 and yoke 30. Bulge 41 is a rib formed in a ridge. For example, bulge 41 can be formed by, for example, press-working the side wall portion of frame 40.

As illustrated in FIGS. 1 and 2, bracket 50 covers opening 40*a* of frame 40. Bracket 50 partially covers opening 40*a* of frame 40 without completely closing opening 40*a* of frame 40. That is, in a state where bracket 50 is attached to frame 40, the air commutated by air guide 4 flows into frame 40.

Bracket 50 is provided with a plurality of through holes as openings through which the air commutated by air guide 4 passes. Specifically, as illustrated in FIGS. 1 to 3, four first through holes 51 positioned inside in a radial direction and four second through holes 52 positioned outside in the radial direction of first through holes 51 are provided in bracket 50.

Bracket 50 is fixed to frame 40. For example, bracket 50 and frame 40 are fixed by a site (recess) between two adjacent bulges 41 of the side wall portion of frame 40 being jointed to bracket 50.

Figure 4:
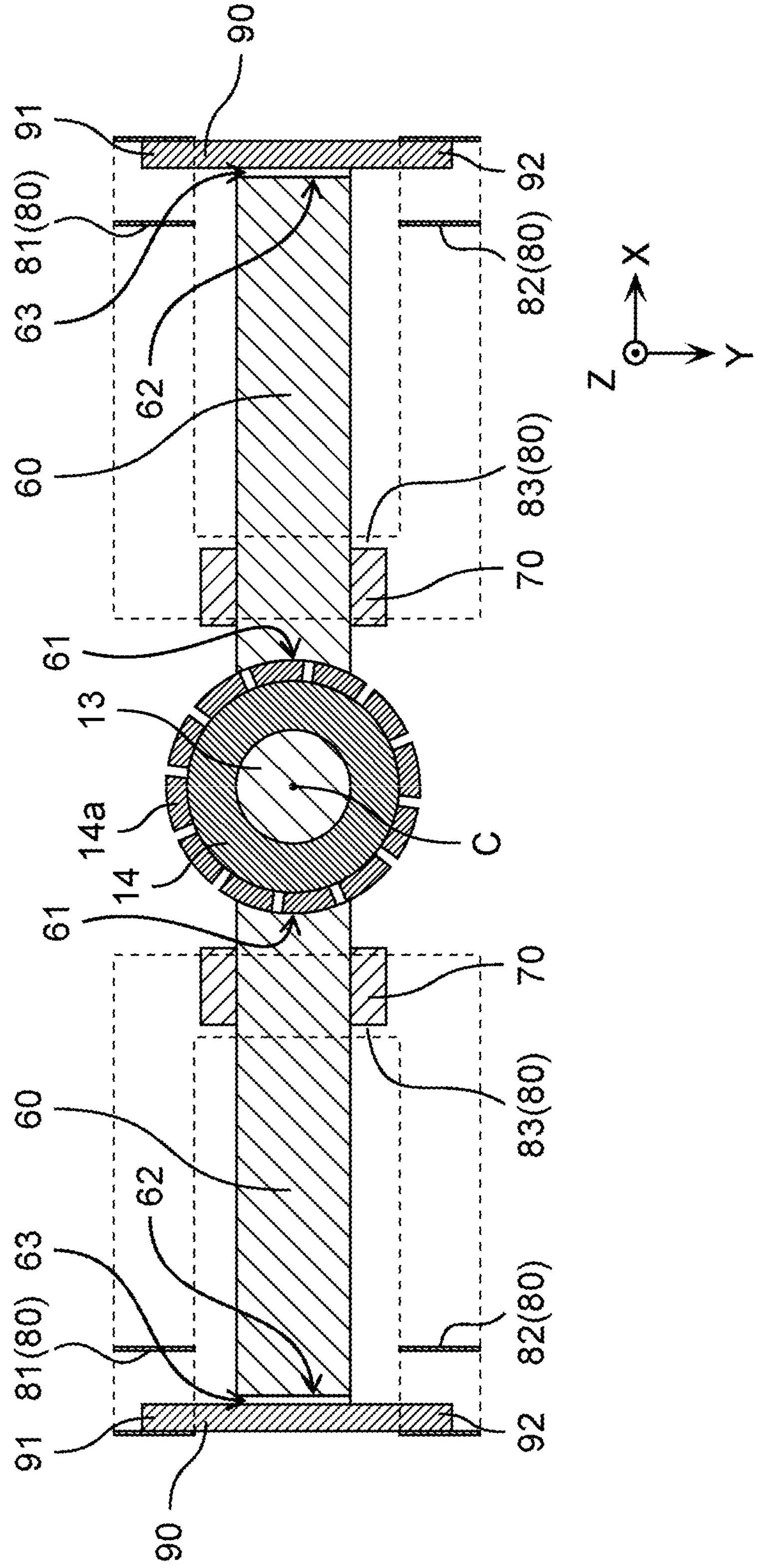
FIG. 4 is a sectional view of the electric air blower according to the first exemplary embodiment taken along a plane passing through the pair of brushes and orthogonal to the axis of the rotating shaft.
Figure 5:
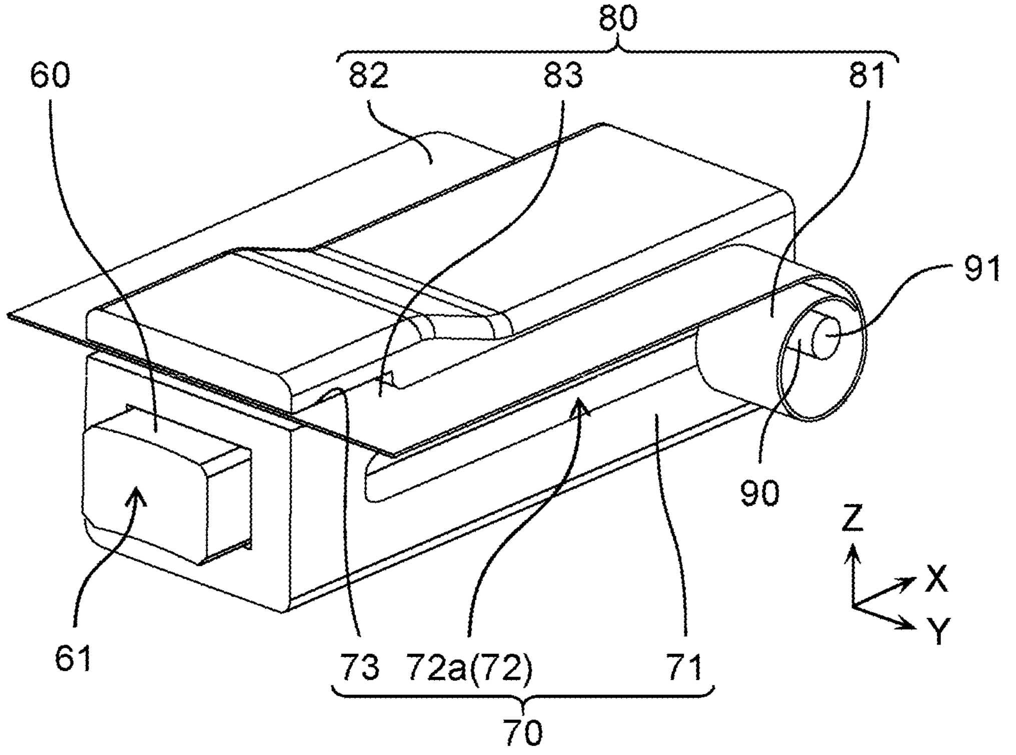
FIG. 5 is a perspective view of an assembly in which the brush, a brush holder, a constant load spring, and a pressing member are combined in the electric motor according to the first exemplary embodiment as viewed obliquely from the front.
Figure 6:
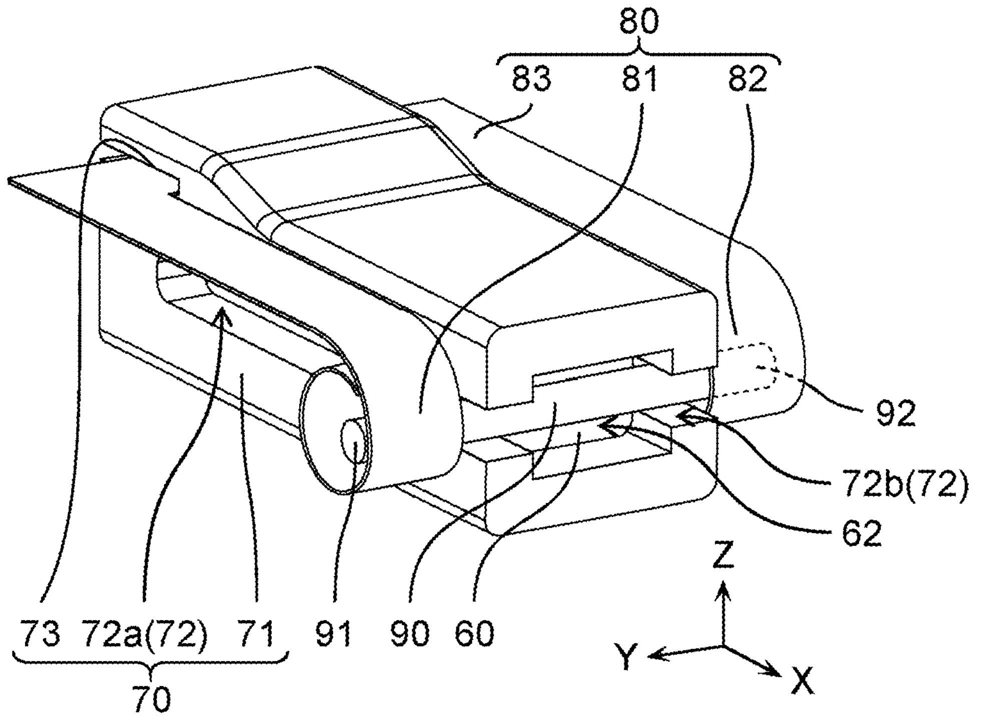
FIG. 6 is a perspective view of the assembly in which the brush, the brush holder, the constant load spring, and the pressing member are combined in the electric motor according to the first exemplary embodiment as viewed obliquely from behind.
Figure 7:
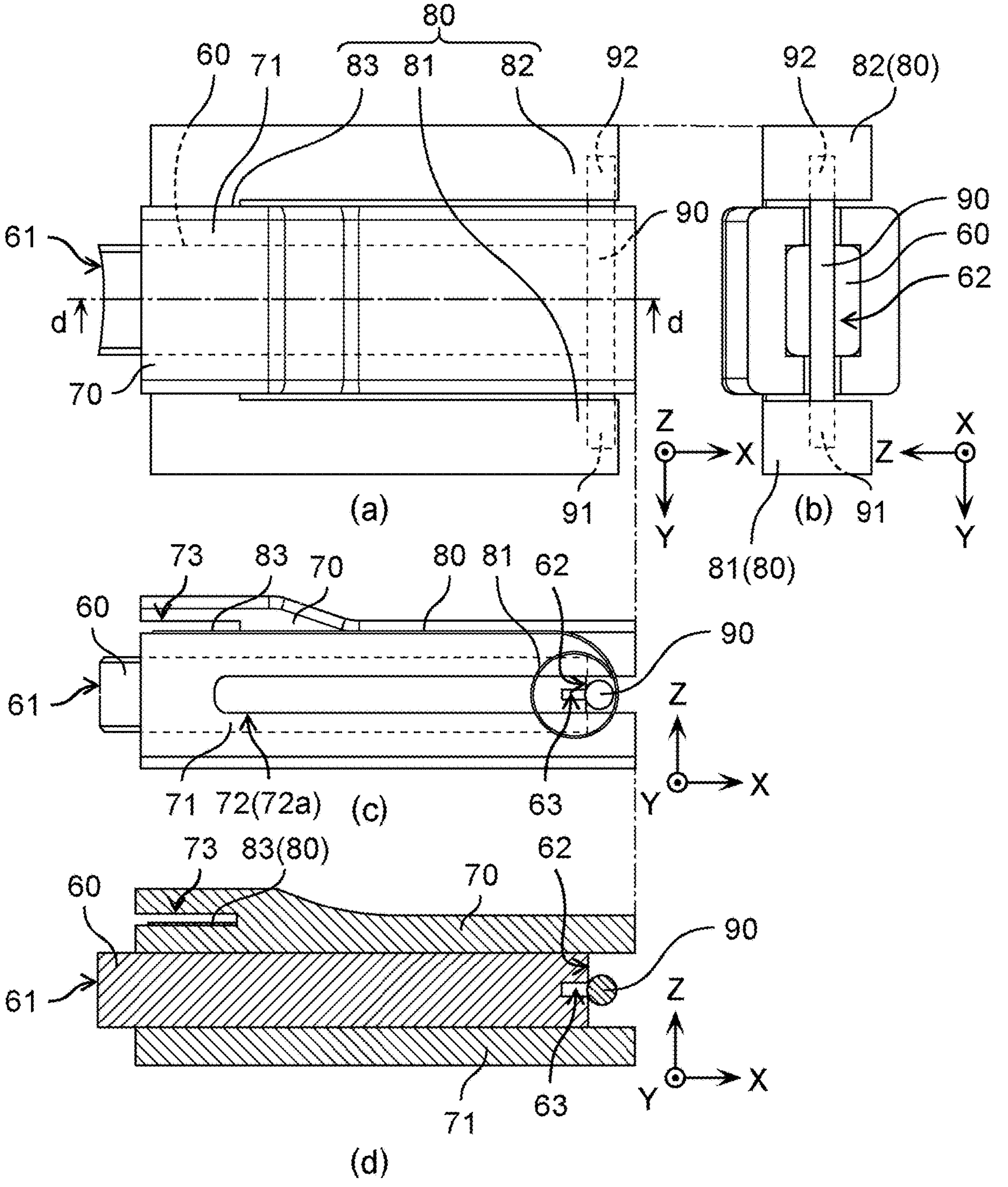
FIG. 7 is a diagram illustrating a configuration of the assembly in which the brush, the brush holder, the constant load spring, and the pressing member are combined in the electric motor according to the first exemplary embodiment.

Next, detailed configurations of brush 60, brush holder 70, constant load spring 80, and pressing member 90 will be described with reference to FIGS. 1 to 3 and FIGS. 4 to 7. FIG. 4 is a sectional view (XY sectional view) of electric air blower 1 according to the first exemplary embodiment taken along a plane passing through the pair of brushes 60 and orthogonal to axis C of rotating shaft 13. FIG. 5 is a perspective view of an assembly in which brush 60, brush holder 70, constant load spring 80, and pressing member 90 are combined in electric motor 2 according to the first exemplary embodiment as viewed obliquely from the front. FIG. 6 is a perspective view of the assembly in which brush 60, brush holder 70, constant load spring 80, and pressing member 90 are combined in electric motor 2 according to the first exemplary embodiment as viewed obliquely from the rear. FIG. 7 is a diagram illustrating a configuration of the assembly in which brush 60, brush holder 70, constant load spring 80, and pressing member 90 are combined in electric motor 2 according to the first exemplary embodiment. (a) of FIG. 7 is a top view, (b) of FIG. 7 is a rear view, (c) of FIG. 7 is a side view, and (d) of FIG. 7 is a sectional view taken along line d-d in (a) of FIG. 7.

As illustrated in FIGS. 1, 2, and 4, brush 60 comes into contact with commutator 14. Specifically, brush 60 comes into contact with commutator segment 14*a* of commutator 14. Brush 60 is a power supply brush (energizing brush) that supplies power to winding coil 12 of rotor 10. For example, a pigtail wire (not shown) electrically connected to a power supply terminal that receives power from an external power supply is connected to brush 60. Brush 60 comes into contact with commutator segment 14*a*, and thus, current (armature current) supplied to brush 60 via the pigtail wire flows to winding coil 12 of rotor 10 via commutator segment 14*a*.

Brush 60 is made of a conductive conductor. Specifically, brush 60 is a carbon brush made of carbon. As an example, brush 60 is a metal graphite brush containing metal such as copper and carbon. In the present exemplary embodiment, brush 60 is a carbon brush containing copper. Brush 60 can be manufactured by pulverizing a kneaded product obtained by kneading graphite powder, copper powder, a binder resin, and a curing agent, compression molding the pulverized product into a rectangular parallelepiped, and firing the resultant. Brush 60 is elongated in an initial state before being worn. As an example, brush 60 is an elongated substantially rectangular parallelepiped.

As illustrated in FIG. 4, brush 60 has front end surface 61 coming into contact with commutator 14 and rear end surface 62 that is a side opposite to front end surface 61.

Front end surface 61 of brush 60 is an end surface at a front end that is one end of brush 60 in a longitudinal direction. Front end surface 61 is an end surface of brush 60 on rotating shaft 13 side (commutator 14 side). Front end surface 61 is a sliding contact surface in sliding contact with commutator segment 14*a* of commutator 14.

Rear end surface 62 of brush 60 is an end surface at a rear end that is the other end of brush 60 in the longitudinal direction. Rear end surface 62 is an end surface of brush 60 on a side opposite to rotating shaft 13 side. Pressing member 90 comes into contact with rear end surface 62. Specifically, as illustrated in FIG. 4, pressing member 90 comes into contact with recess 63 formed on rear end surface 62. That is, recess 63 is formed at a contact portion of rear end surface 62 with pressing member 90.

As illustrated in (c) and (d) of FIG. 7, recess 63 is formed such that a part of rear end surface 62 is recessed toward front end surface 61. Recess 63 is formed such that rear end surface 62 is notched in a rectangular shape in sectional view. Specifically, a shape of recess 63 is rectangular in the XZ section.

Recess 63 is a groove extending in a direction orthogonal to the longitudinal direction of brush 60. As illustrated in FIG. 4, recess 63 is formed from one side surface to the other side surface of brush 60. Recess 63 can be formed, for example, by cutting off a part of flat rear end surface 62 of the rectangular parallelepiped brush with a drill or the like and cutting rear end surface 62. The shape of recess 63 may be formed not by cutting the flat end surface of brush 60 but by a mold when brush 60 is sintered.

Brush 60 is pressed against commutator 14 by receiving a load by constant load spring 80 via pressing member 90. Therefore, brush 60 is directly pressed against commutator 14 by pressing member 90. That is, brush 60 is pressed against commutator 14 by constant load spring 80. Brush 60 is pressed against commutator 14, and thus, brush 60 constantly comes into contact with commutator 14 during an operation of electric motor 2. As a result, front end surface 61 of brush 60 is worn by friction with commutator 14, and brush 60 is shortened. That is, as front end surface 61 of brush 60 pressed against commutator 14 by pressing member 90 is worn, rear end surface 62 moves toward commutator 14.

As illustrated in FIG. 4, brush 60 comes into contact with commutator segment 14*a* of commutator 14 in a direction intersecting axis C of rotating shaft 13 (that is, a radial direction of rotation of rotating shaft 13). Brush 60 is arranged such that the longitudinal direction is the direction (radial direction) orthogonal to axis C of rotating shaft 13.

A plurality of brushes 60 are arranged. Specifically, two brushes 60 are arranged. In this case, a pair of brushes 60 arranged to face each other with commutator 14 interposed therebetween is provided to sandwich commutator 14. That is, the pair of brushes 60 are arranged to oppose each other via commutator 14. Electric motor 2 operates to rotate commutator 14 together with rotating shaft 13, and thus, front end surface 61 of each brush 60 continues to sequentially come into contact with all commutator segments 14*a*.

As illustrated in FIG. 1, brush 60 is held by brush holder 70. Specifically, brush 60 is held by brush holder 70 to be movable in a direction (radial direction) intersecting the direction in which axis C of rotating shaft 13 extends. Brush holder 70 is fixed to frame 40. Specifically, brush holder 70 is inserted into the opening provided in frame 40, and is fixed to frame 40 by a screw. Brush holders 70 are arranged in number corresponding to the number of brushes 60. In the present exemplary embodiment, two brushes 60 are arranged. Thus, two brush holders 70 are also arranged.

As illustrated in FIGS. 5 to 7, brush holder 70 includes brush accommodation portion 71 that accommodates brush 60, as a brush holding portion that holds brush 60. As an example, brush accommodation portion 71 is a tubular portion surrounding brush 60. Brush accommodation portion 71 has an elongated substantially rectangular cylindrical shape extending in the direction intersecting the direction in which axis C of rotating shaft 13 extends. Brush holder 70 is a resin molded article made of an insulating resin material.

Both ends of brush accommodation portion 71 in a longitudinal direction are opened. Brush 60 is arranged in brush accommodation portion 71 in a state where front end surface 61 is exposed from the opening. Brush 60 accommodated in brush accommodation portion 71 protrudes from the opening to come into contact with commutator segment 14*a* of commutator 14. Brush 60 may be arranged in brush accommodation portion 71 in a state of being accommodated in a brush box made of a metal plate.

As illustrated in FIG. 6, slits 72 extending along the longitudinal direction of brush 60 are formed on both side surfaces of brush accommodation portion 71. Specifically, first slit 72*a* extending along the longitudinal direction of brush 60 is formed on one side surface of brush accommodation portion 71. Second slit 72*b* extending along the longitudinal direction of brush 60 is formed on the other side surface of brush accommodation portion 71. First slit 72*a* and second slit 72*b* are provided in parallel at the same height position.

As illustrated in FIGS. 5 to 7, constant load spring 80 is fixed to brush holder 70. That is, brush holder 70 holds not only brush 60 but also constant load spring 80. Specifically, recess 73 for fixing constant load spring 80 is provided in brush holder 70. Recess 73 is provided at a front end of brush holder 70. A wire material having a strip shape forming constant load spring 80 is inserted into recess 73, and thus, constant load spring 80 is fixed to brush holder 70.

Constant load spring 80 is a brush spring for pressing brush 60 against commutator 14. Constant load spring 80 does not directly apply a load to brush 60, but applies a load to pressing member 90 arranged behind rear end surface 62 of brush 60 to press brush 60 against commutator 14.

Constant load spring 80 is a spring that applies a uniform load to brush 60. Constant load spring 80 applies a uniform load to brush 60 by applying a uniform load to pressing member 90. That is, constant load spring 80 applies a load for pressing member 90 to press brush 60 to pressing member 90.

As illustrated in FIGS. 5 to 7, constant load spring 80 is made of a wire material having a strip shape. Constant load spring 80 is a spiral spring, and has a spiral portion (coil portion) in which a wire material having a strip shape is spirally wound. Constant load spring 80 includes, as a pair of spiral portions, first spiral portion 81 and second spiral portion 82 each made of the strip-shaped wire material wound in the spiral shape.

First spiral portion 81 and second spiral portion 82 are arranged to sandwich brush 60. First spiral portion 81 and second spiral portion 82 are arranged to sandwich brush accommodation portion 71 of brush holder 70.

First spiral portion 81 and second spiral portion 82 are formed into the spiral shape by winding around a lateral direction of brush 60. That is, constant load spring 80 is arranged such that coil surfaces of first spiral portion 81 and second spiral portion 82 face a side surface of brush accommodation portion 71. Therefore, a plate surface of the strip-shaped wire material forming first spiral portion 81 drawn out from first spiral portion 81 and a plate surface of the strip-shaped wire material forming second spiral portion 82 drawn out from second spiral portion 82 are parallel to the plane (XY plane) orthogonal to the axis C of rotating shaft 13. Note that, a central axis of the winding of first spiral portion 81 coincides with a central axis of the winding of second spiral portion 82.

Constant load spring 80 further includes coupling portion 83 that couples the strip-shaped wire material forming first spiral portion 81 and the strip-shaped wire material forming second spiral portion 82. Coupling portion 83 of constant load spring 80 is a fixed end of constant load spring 80. That is, coupling portion 83 is fixed at a predetermined position. Coupling portion 83 is fixed to brush holder 70. Specifically, coupling portion 83 is locked to recess 73 provided in brush holder 70.

Similarly to first spiral portion 81 and second spiral portion 82, coupling portion 83 is made of a wire material having a strip shape. The wire material forming first spiral portion 81, the strip-shaped wire material forming second spiral portion 82, and the strip-shaped wire material forming coupling portion 83 are integrated. That is, constant load spring 80 is made of one wire material. The wire material forming first spiral portion 81, the strip-shaped wire material forming second spiral portion 82, and the strip-shaped wire material forming coupling portion 83 have the same plate width. However, the present disclosure is not limited thereto.

Constant load spring 80 is made of one metal plate having a strip shape formed in a predetermined shape. A shape of the strip-shaped metal plate forming constant load spring 80 before forming first spiral portion 81 and second spiral portion 82 is a U-shape in top view. In this case, first spiral portion 81 can be formed by winding a plurality of strip-shaped wire materials forming one leg of the U-shaped metal plate in a spiral shape. Similarly, second spiral portion 82 can be formed by winding a plurality of wire materials each having a strip shape forming the other leg of the U-shaped metal plate in a spiral shape. Therefore, a shape of one round of first spiral portion 81 and second spiral portion 82 is circular.

First spiral portion 81 and second spiral portion 82 having the above configuration have a spring elastic force (spring restoring force) by which the strip-shaped wire materials are drawn out from first spiral portion 81 and second spiral portion 82 such that the drawn strip-shaped wire materials tend to return to original states.

A thickness of the metal plate forming constant load spring 80 is, for example, less than or equal to 0.1 mm. As an example, the thickness of the metal plate forming constant load spring 80 is 0.08 mm or 0.05 mm. The thickness of the metal plate forming constant load spring 80 is not limited to be less than or equal to 0.1 mm. As long as the thickness of the metal plate forming constant load spring 80 can be wound in the spiral shape, the thickness of the metal plate forming constant load spring 80 may be larger than 0.1 mm. The shape of the strip-shaped metal plate forming constant load spring 80 may not be the U-shape.

As illustrated in FIGS. 5 to 7, for constant load spring 80 installed in brush holder 70, the strip-shaped wire material forming first spiral portion 81 is drawn out along one side surface of brush 60. The strip-shaped wire material forming second spiral portion 82 is drawn out along the other side surface of brush 60. Specifically, the strip-shaped wire material forming first spiral portion 81 is drawn out along one side surface of brush accommodation portion 71 of brush holder 70 toward commutator 14. The strip-shaped wire material forming second spiral portion 82 is drawn out along the other side surface of brush accommodation portion 71 of brush holder 70 toward commutator 14.

Pressing member 90 presses brush 60 against commutator 14 by the load from constant load spring 80. Pressing member 90 comes into contact with rear end surface 62 of brush 60. That is, pressing member 90 presses rear end surface 62 of brush 60 against commutator 14 by the load from constant load spring 80.

As illustrated in (a) and (b) of FIG. 7, pressing member 90 has first end 91 and second end 92 each protruding from rear end surface 62 of brush 60. Pressing member 90 is a rod-shaped member including a linear elongated shape. Therefore, first end 91 is one end in the longitudinal direction of pressing member 90 which is a rod-shaped member. Second end 92 is the other end in the longitudinal direction of pressing member 90 that is a rod-shaped member. As an example, pressing member 90 is a rod-shaped member having a columnar shape. However, the present disclosure is not limited thereto. For example, pressing member 90 may be a member having a rod shape such as a cylindrical shape or the like. As an example, pressing member 90 is a metal rod made of a metallic material. However, the present disclosure is not limited thereto. For example, pressing member 90 may be a resin rod made of a resin material.

First end 91 and second end 92 of pressing member 90 protruding from rear end surface 62 of brush 60 are inserted into first spiral portion 81 and second spiral portion 82 of constant load spring 80, respectively. Specifically, first end 91 of pressing member 90 is inserted into first spiral portion 81 and comes into contact with an inner surface of first spiral portion 81. Second end 92 of pressing member 90 is inserted into second spiral portion 82 and comes into contact with an inner surface of second spiral portion 82.

As described above, first spiral portion 81 and second spiral portion 82 of constant load spring 80 are arranged to sandwich brush accommodation portion 71 of brush holder 70. Thus, first end 91 and second end 92 of pressing member 90 protrude from slits 72 provided on both side surfaces of brush accommodation portion 71. Specifically, first end 91 of pressing member 90 protrudes from first slit 72*a* formed in brush accommodation portion 71 and is inserted into first spiral portion 81. Similarly, second end 92 of pressing member 90 protrudes from second slit 72*b* formed in brush accommodation portion 71 and is inserted into second spiral portion 82.

A sectional shape of pressing member 90 is circular at a contact portion between pressing member 90 and each of first spiral portion 81 and second spiral portion 82. Therefore, as illustrated in (c) of FIG. 7, each of first spiral portion 81 and second spiral portion 82 comes into contact with pressing member 90 at one point.

As described above, pressing member 90 comes into contact with recess 63 formed on rear end surface 62 of brush 60. In the XZ section, a sectional shape of recess 63 is rectangular. The sectional shape of pressing member 90 is circular. Therefore, as illustrated in (d) of FIG. 7, rear end surface 62 of brush 60 comes into contact with pressing member 90 at two points in the XZ section. Specifically, in the XZ section, pressing member 90 comes into contact with recess 63 at two points of an upper opening end edge and a lower opening end edge.

Brush 60, brush holder 70, constant load spring 80, and pressing member 90 having the above configuration are assembled to electric motor 2 as follows. Specifically, brush 60 is inserted into brush accommodation portion 71 of brush holder 70 toward commutator 14. Pressing member 90 is arranged behind rear end surface 62 of brush 60. First spiral portion 81 and second spiral portion 82 of constant load spring 80 are hooked on first end 91 and second end 92 of pressing member 90, the strip-shaped wire material is drawn out from spirally wound first spiral portion 81 and second spiral portion 82, and coupling portion 83 is inserted into recess 73 to fix coupling portion 83 to brush holder 70. As a result, constant load spring 80 and pressing member 90 can be set in brush holder 70.

At this time, the strip-shaped wire materials are drawn out from first spiral portion 81 and second spiral portion 82, a load that causes the strip-shaped wire materials forming first spiral portion 81 and second spiral portion 82 to return to the original states is generated. Pressing member 90 presses brush 60 against commutator 14 by the loads of first spiral portion 81 and second spiral portion 82. Specifically, the load generated when the strip-shaped wire material drawn out from first spiral portion 81 returns to the original state is applied to first end 91 of pressing member 90. The load generated when the strip-shaped wire material drawn out from second spiral portion 82 returns to the original state is applied to second end 92 of pressing member 90. As a result, pressing member 90 is pulled toward commutator 14 by first spiral portion 81 and second spiral portion 82. Thus, pressing member 90 coming into contact with rear end surface 62 of brush 60 presses rear end surface 62 of brush 60. Thus, brush 60 is pressed against commutator 14. In this manner, constant load spring 80 presses brush 60 against commutator 14 via pressing member 90 by the loads of first spiral portion 81 and second spiral portion 82.

In electric motor 2 having the above configuration, current supplied to brush 60 flows as armature current (drive current) to winding coil 12 of rotor 10 via commutator 14, and thus, a magnetic flux is generated in rotor 10. A magnetic force generated by interaction between a magnetic flux generated in rotor 10 and a magnetic flux generated from stator 20 becomes torque that rotates rotor 10. At this time, a direction of flow of the current is switched in accordance with a positional relationship when commutator segments 14*a* of commutator 14 come into contact with brush 60. In this manner, the direction of flow of the current is switched, and thus, a rotational force is generated in a constant direction by a repulsive force and an attractive force of the magnetic force generated between rotor 10 and stator 20. This rotational force rotates rotor 10 about axis C of rotating shaft 13. As a result, in electric air blower 1, rotary fan 3 attached to rotating shaft 13 rotates.

Rotor 10 rotates in this manner, and thus, front end surface 61 of brush 60 coming into contact with commutator 14 is worn. At this time, brush 60 constantly receives a constant load (pressing force) from constant load spring 80 via pressing member 90 and is pressed against commutator 14. As a result, as front end surface 61 of brush 60 is worn due to friction with commutator 14, brush 60 slides toward commutator 14 in brush accommodation portion 71 of brush holder 70. That is, rear end surface 62 of brush 60 moves toward commutator 14.

At this time, constant load spring 80 applies, to brush 60 by pressing member 90, the load generated by drawing out the strip-shaped wire materials from first spiral portion 81 and second spiral portion 82. As a result, pressing member 90 is pressed against rear end surface 62 of brush 60 by the loads of first spiral portion 81 and second spiral portion 82.

Figure 8:
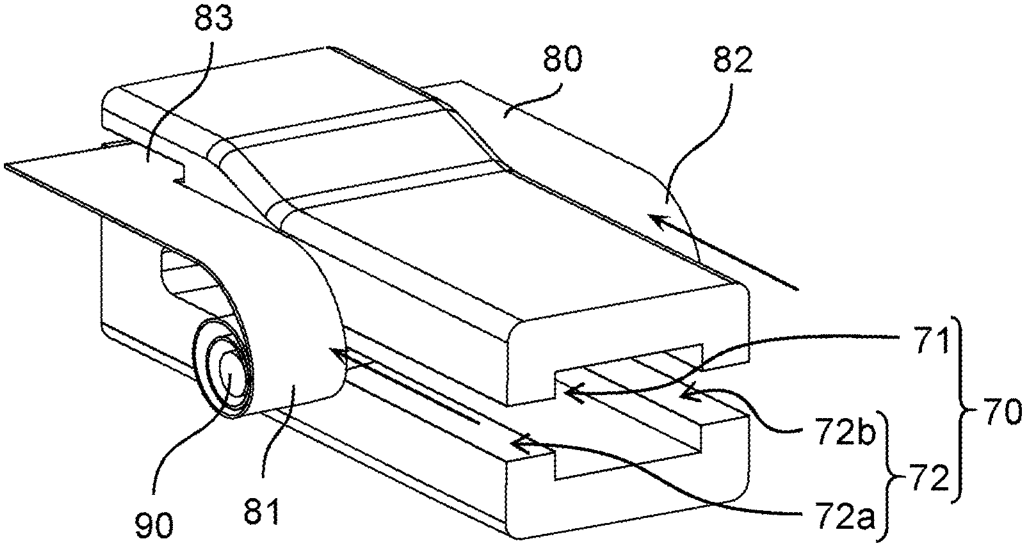
FIG. 8 is a perspective view illustrating a scene when the pressing member moves toward a commutator due to wear of the brush in the assembly in which the brush, the brush holder, the constant load spring, and the pressing member are combined.
Figure 9:
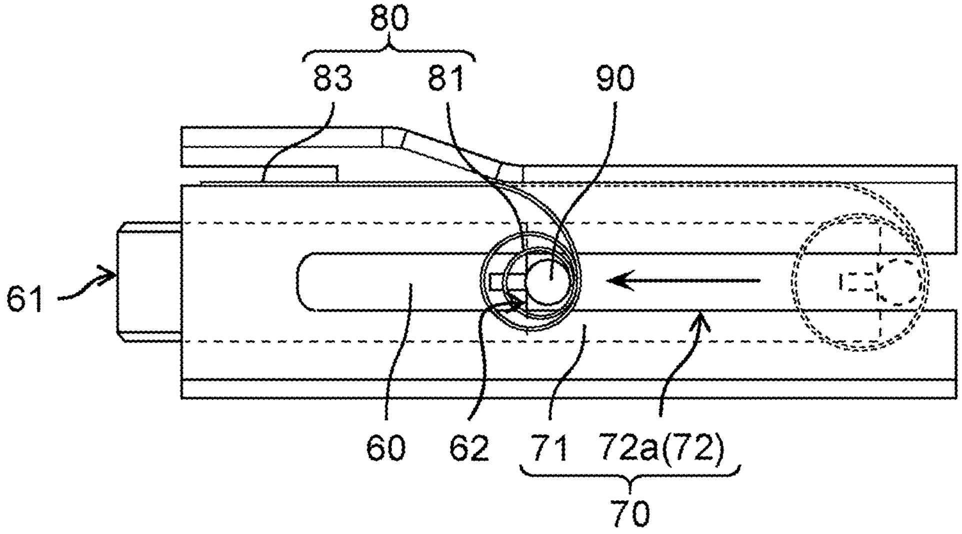
FIG. 9 is a side view illustrating a scene when the pressing member moves toward the commutator due to the wear of the brush in the assembly in which the brush, the brush holder, the constant load spring, and the pressing member are combined.

FIG. 8 is a perspective view illustrating a scene when pressing member 90 moves toward commutator 14 due to the wear of brush 60 in the assembly in which brush 60, brush holder 70, constant load spring 80, and pressing member 90 are combined. FIG. 9 is a side view illustrating a scene when pressing member 90 moves toward commutator 14 due to the wear of brush 60 in the assembly in which brush 60, brush holder 70, constant load spring 80, and pressing member 90 are combined. As illustrated in FIGS. 8 and 9, as brush 60 is worn and pressing member 90 moves toward commutator 14, first spiral portion 81 and second spiral portion 82 of constant load spring 80 tend to return to the original state by the spring restoring force. As a result, the strip-shaped wire material forming each of first spiral portion 81 and second spiral portion 82 is unwound. Therefore, as brush 60 is worn, first spiral portion 81 and second spiral portion 82 also approach commutator 14. As a result, as brush 60 is worn, pressing member 90 inserted into first spiral portion 81 and second spiral portion 82 moves toward commutator 14 while pressing brush 60 against commutator 14.

Figure 10:
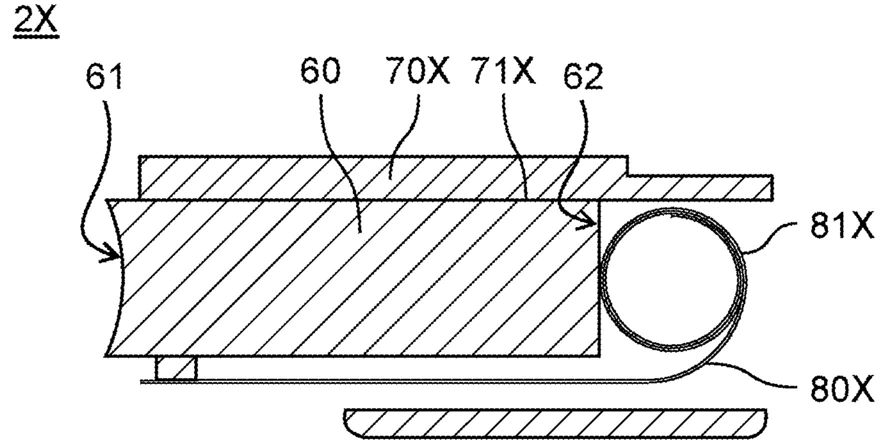
FIG. 10 is a sectional view illustrating a brush and a constant load spring set in a brush holder in an electric motor of the related art.
Figure 11:
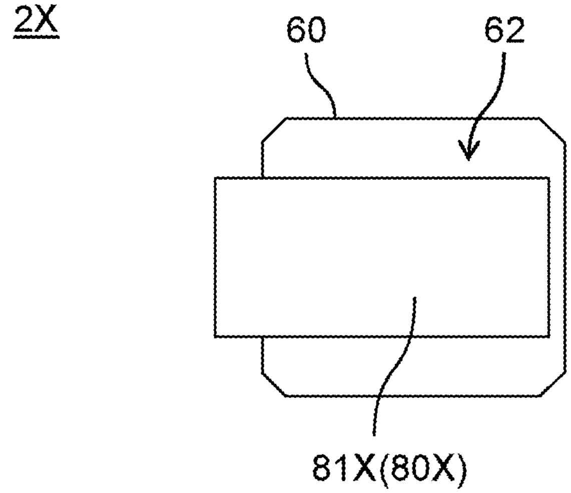
FIG. 11 is a diagram of a brush and a constant load spring in an electric motor of an example of the related art as viewed from a back side.

Here, the operations and effects of electric motor 2 according to the present exemplary embodiment will be described in comparison with electric motor 2X of the related art. FIG. 10 is a sectional view illustrating brush 60 and constant load spring 80X set in brush holder 70X in electric motor 2X of the related art. FIG. 11 is a diagram of brush 60 and constant load spring 80X in electric motor 2X of an example of the related art as viewed from a back side.

As illustrated in FIG. 10, in electric motor 2X of the related art, constant load spring 80X includes one spiral portion 81X. Constant load spring 80X is arranged such that spiral portion 81X is positioned in brush accommodation portion 71X of brush holder 70X together with brush 60. At this time, spiral portion 81X of constant load spring 80X is formed into a spiral shape by winding around an axial direction of a rotating shaft of electric motor 2X. Spiral portion 81X of constant load spring 80X is arranged behind rear end surface 62 of brush 60. That is, spiral portion 81X is arranged in a slidable range of brush 60. Thus, in electric motor 2X of the related art, a length of brush 60 needs to be shortened by a dimension of spiral portion 81X. Thus, a lifespan of electric motor 2X is shortened. On the other hand, in a case where the length of brush 60 is not shortened, a length of brush holder 70X needs to be lengthened. Thus, a size of electric motor 2X is increased.

In electric motor 2X using constant load spring 80X as a brush spring, a height of brush 60 is determined by a plate width of a wire material having a strip shape forming constant load spring 80X. Specifically, first, the plate width of the strip-shaped wire material forming constant load spring 80X is required to be more than or equal to a certain value from the viewpoint of a load generated by spiral portion 81X and the manufacturing of constant load spring 80X. Furthermore, in order to suppress the rattling of brush 60 receiving the load (pressing force) of spiral portion 81X, rear end surface 62 of brush 60X needs to have a stopper for spiral portion 81X. Thus, as illustrated in FIG. 11, the height of brush 60 needs to be higher than a height of spiral portion 81X. That is, the height of brush 60 needs to be larger than the plate width of the strip-shaped wire material forming constant load spring 80X. In this manner, when spiral portion 81X is arranged behind brush 60 using constant load spring 80X as a brush spring, the height of brush 60 needs to be increased. Thus, it is difficult to reduce a thickness of electric motor 2X.

By contrast, in electric motor 2 according to the present exemplary embodiment, constant load spring 80 having first spiral portion 81 and second spiral portion 82 is used as the brush spring. Pressing member 90 is arranged to come into contact with rear end surface 62 of brush 60. Therefore, pressing member 90 presses brush 60 against commutator 14 by applying the load to pressing member 90 by constant load spring 80.

Specifically, each pressing member 90 has first end 91 and second end 92 protruding from rear end surface 62 of brush 60. In brush 60, the load generated when the strip-shaped wire material drawn from first spiral portion 81 returns to the original state is applied to first end 91 of pressing member 90. Brush 60 is pressed against commutator 14 by applying the load generated when the strip-shaped wire material drawn from second spiral portion 82 returns to the original state to second end 92 of pressing member 90.

With this configuration, constant load spring 80 can press brush 60 against commutator 14 without arranging first spiral portion 81 and second spiral portion 82 behind rear end surface 62 of brush 60. That is, even though first spiral portion 81 and second spiral portion 82 are not arranged in the slidable range of brush 60, the loads of first spiral portion 81 and second spiral portion 82 can be applied to brush 60 via pressing member 90. As a result, even though constant load spring 80 is used as the brush spring, it is not necessary to shorten the length of brush 60. Thus, it is possible to realize long-lifespan electric motor 2.

Furthermore, first spiral portion 81 and second spiral portion 82 may not be arranged on rear end surface 62 of brush 60. Thus, unlike conventional electric motor 2X, there is no need to increase the height (length in the Z-axis direction) of brush 60. That is, the height of brush 60 does not need to be larger than the plate width of the strip-shaped wire material forming constant load spring 80. As a result, even though constant load spring 80 is used as the brush spring, small electric motor 2 can be easily realized.

In electric motor 2 according to the present exemplary embodiment, first end 91 of pressing member 90 is inserted into first spiral portion 81 of constant load spring 80 and comes into contact with the inner surface of first spiral portion 81. Second end 92 of pressing member 90 is inserted into second spiral portion 82 of constant load spring 80 and comes into contact with the inner surface of second spiral portion 82.

With this configuration, when the strip-shaped wire materials forming first spiral portion 81 and second spiral portion 82 tends to return to the original state due to wear of brush 60, pressing member 90 inserted into first spiral portion 81 and second spiral portion 82 is pulled by first spiral portion 81 and second spiral portion 82. As a result, the load of constant load spring 80 can be applied to brush 60 via pressing member 90. Therefore, brush 60 can be pressed against commutator 14.

In the present exemplary embodiment, pressing member 90 is a rod-shaped member having a linear elongated shape. First end 91 is one end in the longitudinal direction of the rod-shaped member. Second end 92 is the other end in the longitudinal direction of the rod-shaped member.

With this configuration, pressing member 90 can be manufactured at low cost. Thus, even though pressing member 90 is used as a new additional component when brush 60 is pressed against commutator 14 by using constant load spring 80, it is possible to suppress a significant increase in the cost of electric motor 2.

In electric motor 2 according to the present exemplary embodiment, in a section (XZ section in the present exemplary embodiment) taken along a plane passing through axis C of rotating shaft 13, each of first spiral portion 81 and second spiral portion 82 comes into contact with pressing member 90 at one point. Specifically, the sectional shape of pressing member 90 is circular at the contact portion between pressing member 90 and each of first spiral portion 81 and second spiral portion 82.

With this configuration, frictional resistance between first spiral portion 81 and second spiral portion 82 and pressing member 90 can be reduced. Thus, the slidability of constant load spring 80 can be improved. As a result, the loads by first spiral portion 81 and second spiral portion 82 can be stably applied to pressing member 90.

In electric motor 2 according to the present exemplary embodiment, in a section (XZ section in the present exemplary embodiment) taken along a plane passing through axis C of rotating shaft 13, rear end surface 62 of brush 60 comes into contact with pressing member 90 at two points.

With this configuration, it is possible to prevent pressing member 90 coming into contact with rear end surface 62 of brush 60 from shaking when brush 60 slides.

Specifically, recess 63 is formed at the contact portion of rear end surface 62 of brush 60 with pressing member 90. As a result, pressing member 90 and rear end surface 62 of brush 60 come into contact with each other at two points at the opening end edges of recess 63. Specifically, in the XZ section, pressing member 90 comes into contact with recess 63 at two points of one opening end edge and the other opening end edge in the Z-axis direction. As a result, pressing member 90 can be prevented from shaking in the Z-axis direction.

In electric motor 2 according to the present exemplary embodiment, first slit 72*a* and second slit 72*b* extending along the longitudinal direction of brush 60 are formed on one side surface and the other side surface of brush accommodation portion 71 of brush holder 70. First end 91 of pressing member 90 protrudes from first slit 72*a*. Second end 92 of pressing member 90 protrudes from second slit 72*b*.

With this configuration, when brush 60 is worn and the strip-shaped wire materials forming first spiral portion 81 and second spiral portion 82 are unwound, pressing member 90 can be slid-moved toward commutator 14 along first slit 72*a* and second slit 72*b*. That is, pressing member 90 can be moved toward commutator 14 while being held by brush holder 70. In this manner, first slit 72*a* and second slit 72*b* function as guides when pressing member 90 moves toward commutator 14.

In electric motor 2 according to the present exemplary embodiment, first spiral portion 81 and second spiral portion 82 of constant load spring 80 are arranged to sandwich brush accommodation portion 71 in which brush 60 is accommodated. That is, first spiral portion 81 and second spiral portion 82 are arranged on a side surface of brush 60.

With this configuration, even though constant load spring 80 having first spiral portion 81 and second spiral portion 82 is used, it is possible to suppress an increase in height of electric motor 2. Thus, small electric motor 2 can be realized.

In electric motor 2 according to the present exemplary embodiment, constant load spring 80 includes coupling portion 83 in which the strip-shaped wire material forming first spiral portion 81 and the strip-shaped wire material forming second spiral portion 82 are coupled. Coupling portion 83 is the fixed end of constant load spring 80.

With this configuration, a direction of the load generated when the strip-shaped wire materials drawn out from first spiral portion 81 and second spiral portion 82 return to the original state is not a direction in which coupling portion 83 is directed toward first spiral portion 81 and second spiral portion 82, but a direction in which first spiral portion 81 and second spiral portion 82 are directed toward coupling portion 83. Therefore, when brush 60 is worn, coupling portion 83 does not move toward first spiral portion 81 and second spiral portion 82, but first spiral portion 81 and second spiral portion 82 moves toward coupling portion 83. The load is generated in the direction in which first spiral portion 81 and second spiral portion 82 move toward coupling portion 83, and thus, pressing member 90 can be pressed against rear end surface 62 of brush 60 by the loads of first spiral portion 81 and second spiral portion 82. As a result, brush 60 is pressed against commutator 14 by pressing member 90.

In this case, coupling portion 83 of constant load spring 80 is fixed to brush holder 70. Specifically, coupling portion 83 is fixed to recess 73 of brush holder 70.

With this configuration, constant load spring 80 can be easily fixed to brush holder 70 with coupling portion 83 as the fixed end.

As described above, electric motor 2 according to the present exemplary embodiment includes rotor 10 including rotating shaft 13 extending in the axial direction, commutator 14 attached to rotating shaft 13, brush 60 including front end surface 61 coming into contact with commutator 14 and rear end surface 62 positioned on the side opposite to front end surface 61, constant load spring 80 including first spiral portion 81 and second spiral portion 82 each made of the strip-shaped wire material wound in the spiral shape and including the fixed end on front end surface 61 side of brush 60, and pressing member 90 coming into contact with rear end surface 62 of brush 60 to press brush 60 against commutator 14 by the load from constant load spring 80.

As a result, it is possible to realize the long-lifespan electric motor.

Second Exemplary Embodiment

Figure 12:
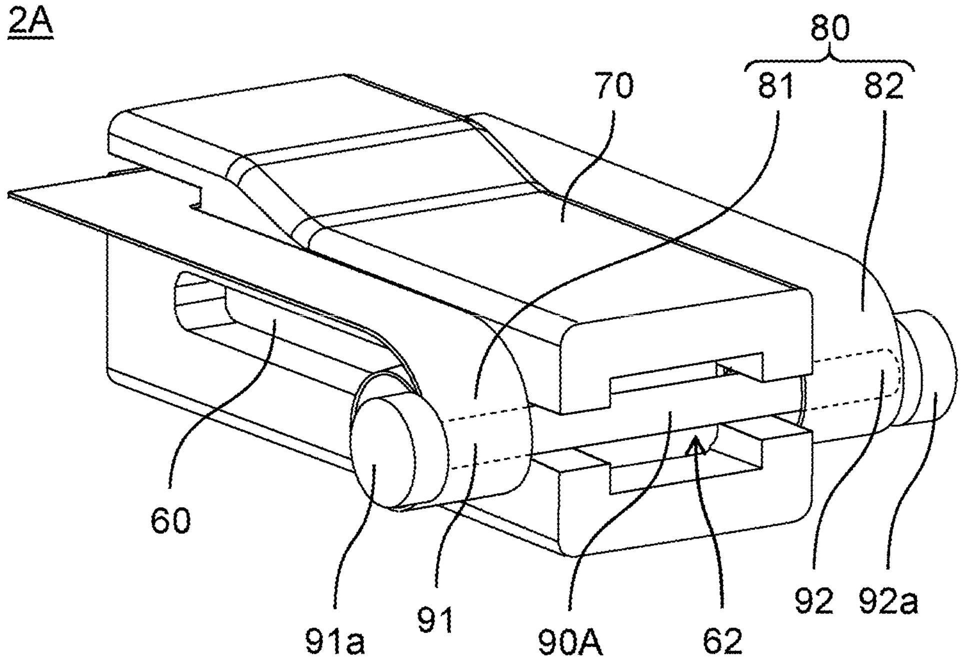
FIG. 12 is a perspective view illustrating an assembly in which a brush, a brush holder, a constant load spring, and a pressing member are combined in an electric motor according to a second exemplary embodiment.
Figure 13:
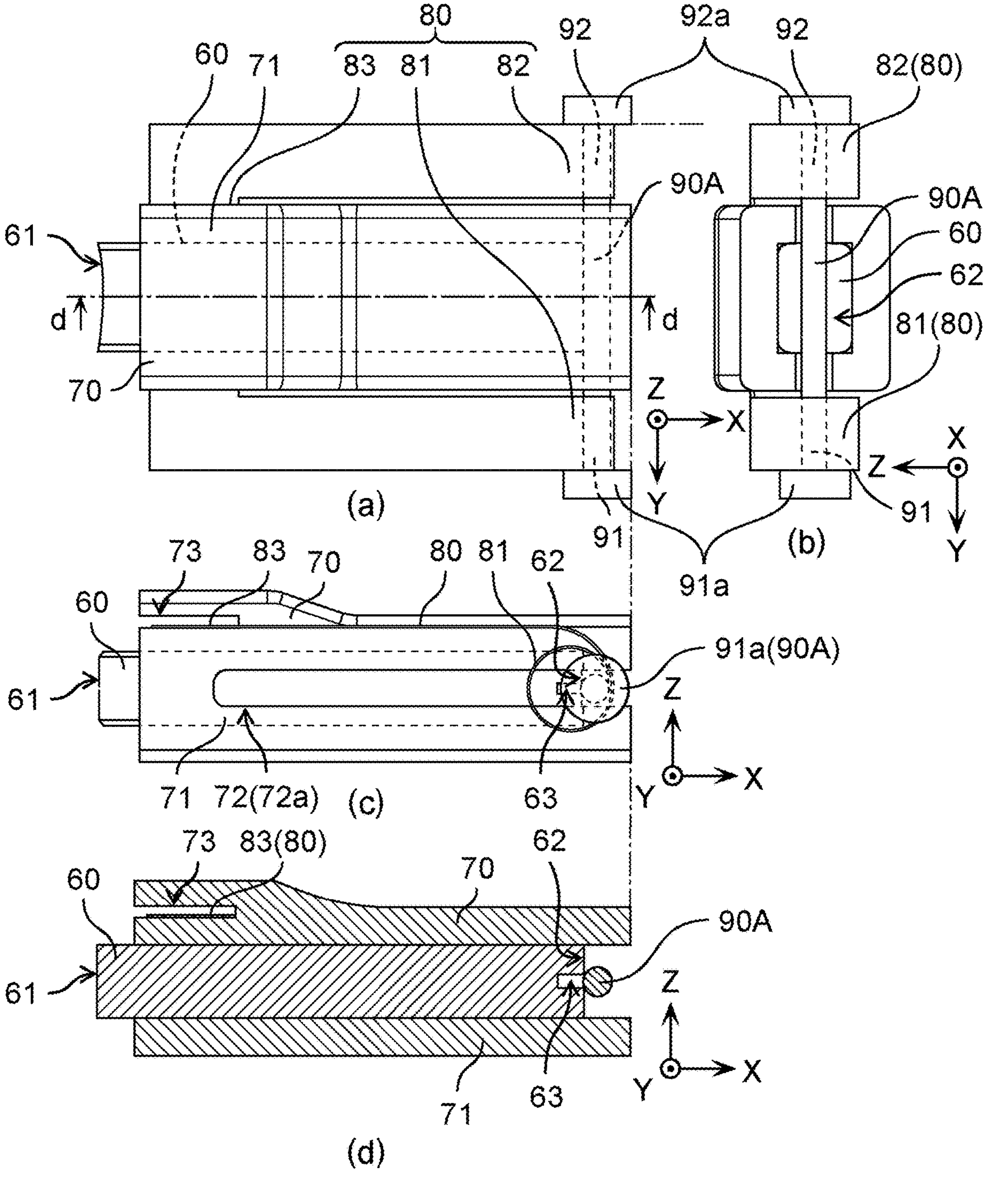
FIG. 13 is a diagram illustrating a configuration of the assembly in which the brush, the brush holder, the constant load spring, and the pressing member are combined in the electric motor according to the second exemplary embodiment.

Next, a second exemplary embodiment will be described with reference to FIGS. 12 and 13. FIG. 12 is a perspective view illustrating an assembly in which brush 60, brush holder 70, constant load spring 80, and pressing member 90A are combined in electric motor 2A according to the second exemplary embodiment. FIG. 13 is a diagram illustrating a configuration of the assembly in which brush 60, brush holder 70, constant load spring 80, and pressing member 90A are combined in electric motor 2A according to the second exemplary embodiment. (a) of FIG. 13 is a top view, (b) of FIG. 13 is a rear view, (c) of FIG. 13 is a side view, and (d) of FIG. 13 is a sectional view taken along line d-d of (a) of FIG. 13.

Electric motor 2A according to the present exemplary embodiment is different from electric motor 2 according to the first exemplary embodiment in a configuration of pressing member 90A. Specifically, pressing member 90A in the present exemplary embodiment further includes first fall-off prevention portion 91*a* and second fall-off prevention portion 92*a* in pressing member 90 according to the first exemplary embodiment.

First fall-off prevention portion 91*a* has a function of preventing pressing member 90A inserted into first spiral portion 81 of constant load spring 80 from falling off from first spiral portion 81. First fall-off prevention portion 91*a* is provided at first end 91 of pressing member 90A. First fall-off prevention portion 91*a* is a large diameter portion having a diameter larger than the columnar rod-shaped portion in pressing member 90A. As an example, first fall-off prevention portion 91*a* has a disk shape.

Second fall-off prevention portion 92*a* has a function of preventing pressing member 90A inserted into second spiral portion 82 of constant load spring 80 from falling off from second spiral portion 82. Second fall-off prevention portion 92*a* is provided at second end 92 of pressing member 90A. Second fall-off prevention portion 92*a* is a large diameter portion having a diameter larger than the columnar rod-shaped portion in pressing member 90A. As an example, second fall-off prevention portion 92*a* has a disk shape.

Shapes of first fall-off prevention portion 91*a* and second fall-off prevention portion 92*a* are not limited to the disk shape. The shapes of first fall-off prevention portion 91*a* and second fall-off prevention portion 92*a* may be any shapes as long as pressing member 90A does not fall off from first spiral portion 81 or second spiral portion 82. For example, the shapes of first fall-off prevention portion 91*a* and second fall-off prevention portion 92*a* may be any shapes as long as pressing member 90A is hooked by first spiral portion 81 or second spiral portion 82 when the pressing member tries to move in a direction of falling off from first spiral portion 81 or second spiral portion 82.

Electric motor 2A according to the present exemplary embodiment has the same configuration as electric motor 2 according to the first exemplary embodiment except that pressing member 90A includes first fall-off prevention portion 91*a* and second fall-off prevention portion 92*a*.

Therefore, electric motor 2A according to the present exemplary embodiment has effects similar to the effects of electric motor 2 according to the first exemplary embodiment. For example, in electric motor 2A according to the present exemplary embodiment, pressing member 90A presses brush 60 against commutator 14 by applying the load to pressing member 90A by constant load spring 80 having first spiral portion 81 and second spiral portion 82 as in the first exemplary embodiment.

With this configuration, even though constant load spring 80 is used as a brush spring, it is not necessary to shorten a length of brush 60. Therefore, it is possible to realize long-lifespan electric motor 2A. It is not necessary to increase a height of brush 60. Therefore, small electric motor 2A can be easily realized.

In electric motor 2A, pressing member 90A includes first fall-off prevention portion 91*a* and second fall-off prevention portion 92*a*.

With this configuration, a load in a direction toward commutator 14 is applied to pressing member 90A by constant load spring 80. Thus, as illustrated in (c) of FIG. 13, in side view, first fall-off prevention portion 91*a* and second fall-off prevention portion 92*a* of pressing member 90A partially overlap first spiral portion 81 and second spiral portion 82. As a result, when pressing member 90A moves in a Y-axis direction, first fall-off prevention portion 91*a* is hooked by first spiral portion 81, or second fall-off prevention portion 92*a* is hooked by second spiral portion 82. Therefore, when brush 60 slides and pressing member 90A moves toward commutator 14, pressing member 90A can be prevented from falling off from first spiral portion 81 or second spiral portion 82.

Third Exemplary Embodiment

Figure 14:
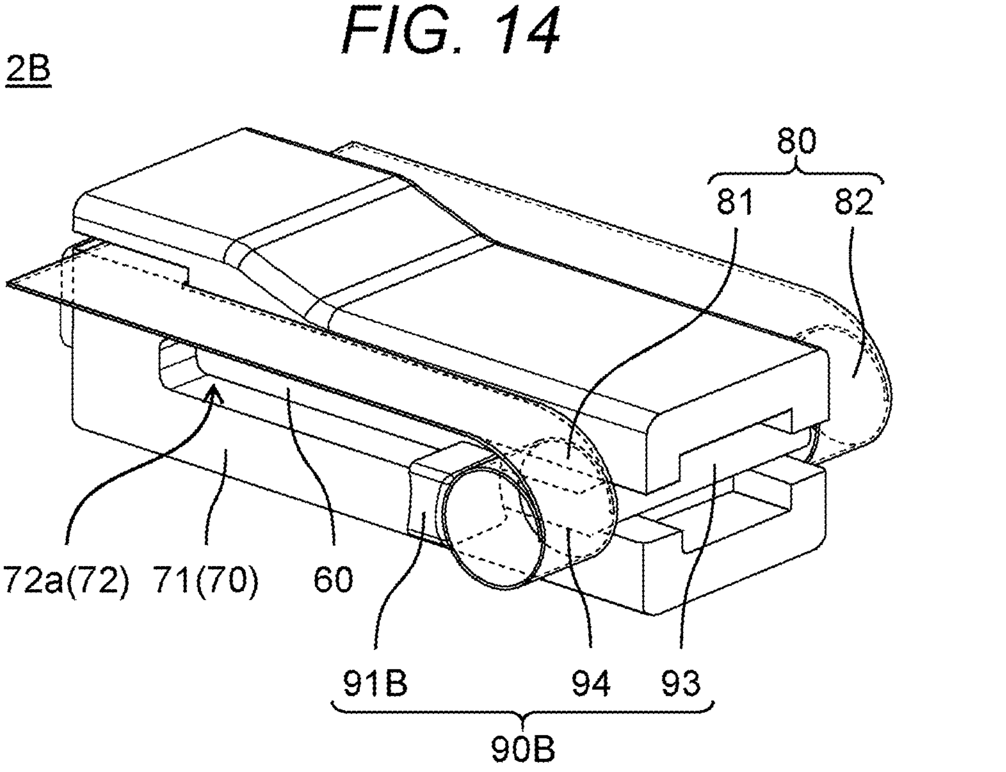
FIG. 14 is a perspective view illustrating an assembly in which a brush, a brush holder, a constant load spring, and a pressing member are combined in an electric motor according to a third exemplary embodiment.
Figure 15:
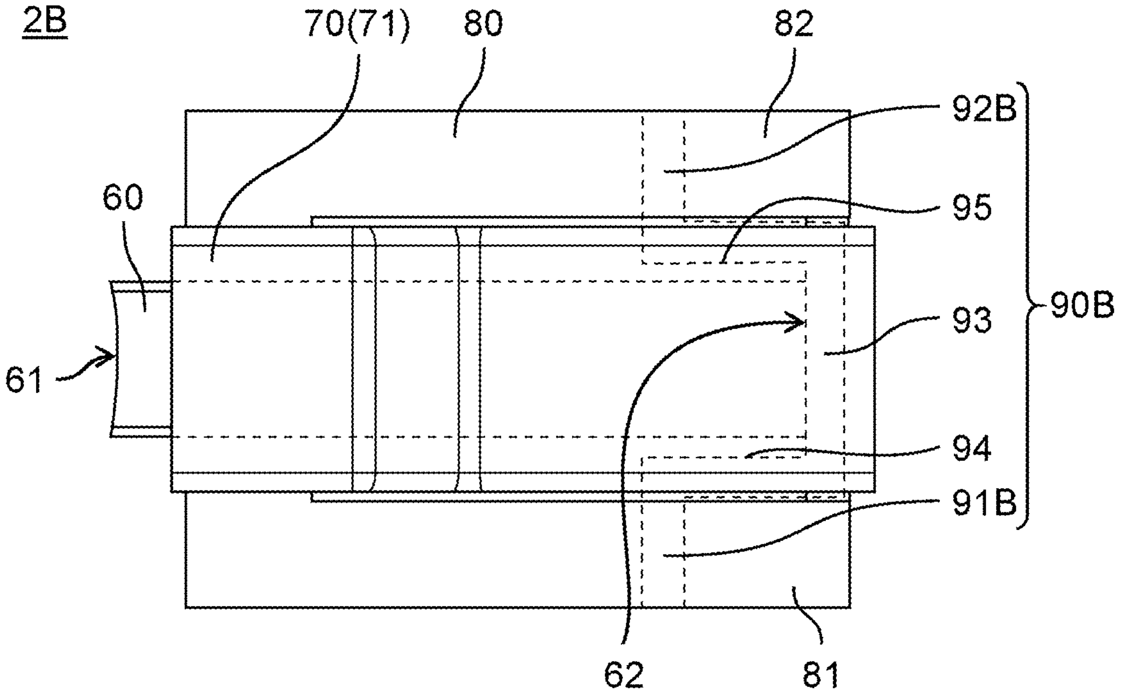
FIG. 15 is a diagram illustrating a configuration of the assembly in which the brush, the brush holder, the constant load spring, and the pressing member are combined in the electric motor according to the third exemplary embodiment.

Next, a third exemplary embodiment will be described with reference to FIGS. 14 and 15. FIG. 14 is a perspective view illustrating an assembly in which brush 60, brush holder 70, constant load spring 80, and pressing member 90B are combined in electric motor 2B according to the third exemplary embodiment. FIG. 15 is a perspective view illustrating the assembly in which brush 60, brush holder 70, constant load spring 80, and pressing member 90B are combined in electric motor 2B according to the third exemplary embodiment.

Electric motor 2B according to the present exemplary embodiment is different from electric motor 2 according to the first exemplary embodiment in a configuration of pressing member 90B. Specifically, in electric motor 2 according to the first exemplary embodiment, pressing member 90 includes only a rod-shaped member having a linear elongated shape. However, in electric motor 2B according to the present exemplary embodiment, pressing member 90B includes linear elongated rod-shaped portion 93, first extending portion 94, and second extending portion 95. First extending portion 94 extends from one end of rod-shaped portion 93 toward commutator 14. Second extending portion 95 extends from the other end of rod-shaped portion 93 toward commutator 14.

Rod-shaped portion 93 comes into contact with rear end surface 62 of brush 60. Rod-shaped portion 93 protrudes from rear end surface 62 of brush 60. Rod-shaped portion 93 has, for example, a columnar shape.

First extending portion 94 extends along one side surface of brush 60. An end of first extending portion 94 is first end 91B of pressing member 90B. First end 91B is formed to protrude from the end of first extending portion 94 toward a side opposite to brush 60 side.

First end 91B that is the end of first extending portion 94 comes into contact with first spiral portion 81 of constant load spring 80. First end 91B comes into contact with an outer surface of first spiral portion 81 on the fixed end side of constant load spring 80. That is, first end 91B comes into contact with an outer surface of first spiral portion 81 on coupling portion 83 side and an outer surface on coupling portion 83 side of an outer surface on a side opposite to coupling portion 83 side. First end 91B has a cylindrical surface in surface contact with an outer surface of first spiral portion 81.

Second extending portion 95 extends along the other side surface of brush 60. An end of second extending portion 95 is second end 92B of pressing member 90B. Second end 92B is formed to protrude from the end of second extending portion 95 toward the side opposite to brush 60 side.

A second end 92B which is an end of the second extending portion 95 comes into contact with second spiral portion 82 of constant load spring 80. Second end 92B comes into contact with the outer surface of second spiral portion 82 on the fixed end side of constant load spring 80. That is, second end 92B comes into contact with the outer surface of second spiral portion 82 on coupling portion 83 side and the outer surface on coupling portion 83 side of the outer surface on the opposite side to coupling portion 83 side. Second end 92B has a cylindrical surface in surface contact with the outer surface of second spiral portion 82.

In electric motor 2B having the above configuration, a method for applying a load to pressing member 90B by constant load spring 80 is different from electric motor 2 according to the first exemplary embodiment.

Specifically, in the first exemplary embodiment, first end 91 of pressing member 90 is inserted into first spiral portion 81 of constant load spring 80 and comes into contact with the inner surface of first spiral portion 81, and second end 92 of pressing member 90 is inserted into second spiral portion 82 of constant load spring 80 and comes into contact with the inner surface of second spiral portion 82. As a result, first spiral portion 81 and second spiral portion 82 apply the load to pressing member 90 to pull first end 91 and second end 92 of pressing member 90 toward commutator 14.

By contrast, in the present exemplary embodiment, first end 91B of pressing member 90B comes into contact with an outer surface of first spiral portion 81 on commutator 14 side (fixed end side) of constant load spring 80, and second end 92B of pressing member 90B comes into contact with an outer surface of second spiral portion 82 on commutator 14 side (fixed end side) of constant load spring 80. With this configuration, first spiral portion 81 and second spiral portion 82 apply the load to push first end 91B and second end 92B of pressing member 90B toward commutator 14.

Except for pressing member 90B, electric motor 2B according to the present exemplary embodiment and electric motor 2 according to the first exemplary embodiment have the same configuration.

Therefore, electric motor 2B according to the present exemplary embodiment has effects similar to the effects of electric motor 2 according to the first exemplary embodiment. For example, in electric motor 2B according to the present exemplary embodiment, pressing member 90B presses brush 60 against commutator 14 by applying the load to pressing member 90B by constant load spring 80 having first spiral portion 81, second spiral portion 82 as in the first exemplary embodiment.

With this configuration, even though constant load spring 80 is used as a brush spring, it is not necessary to shorten a length of brush 60. Thus, it is possible to realize long-lifespan electric motor 2B. It is not necessary to increase a height of brush 60. Thus, small electric motor 2B can be easily realized.

Modification

The technique of the present disclosure has been described above based on the first to third exemplary embodiments. However, the present disclosure is not limited to the first to third exemplary embodiments.

Figure 16:
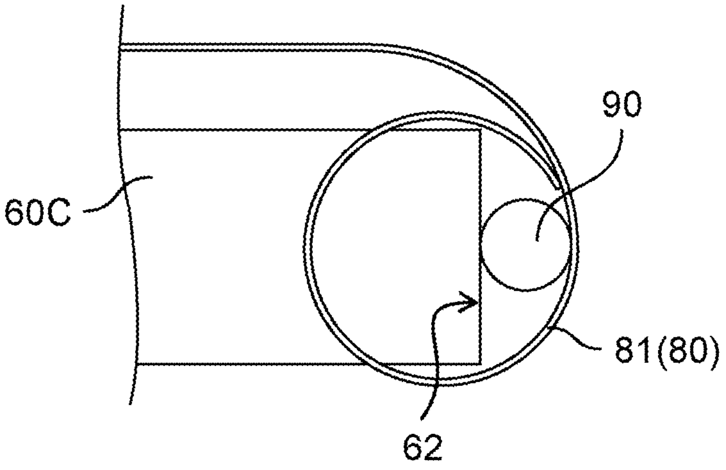
FIG. 16 is a diagram illustrating configurations of a brush, a constant load spring, and a pressing member in an electric motor according to Modification 1.

For example, in the first to third exemplary embodiments, recess 63 is formed on rear end surface 62 of brush 60. However, the present disclosure is not limited thereto. FIG. 16 is a diagram illustrating configurations of brush 60C, constant load spring 80, and pressing member 90 in an electric motor according to Modification 1. Specifically, as illustrated in FIG. 16, brush 60C having no recess 63 on rear end surface 62 may be used. In this case, pressing member 90 having a circular sectional shape and rear end surface 62 of brush 60C do not come into contact with each other at two points but come into contact with each other at one point.

Figure 17:
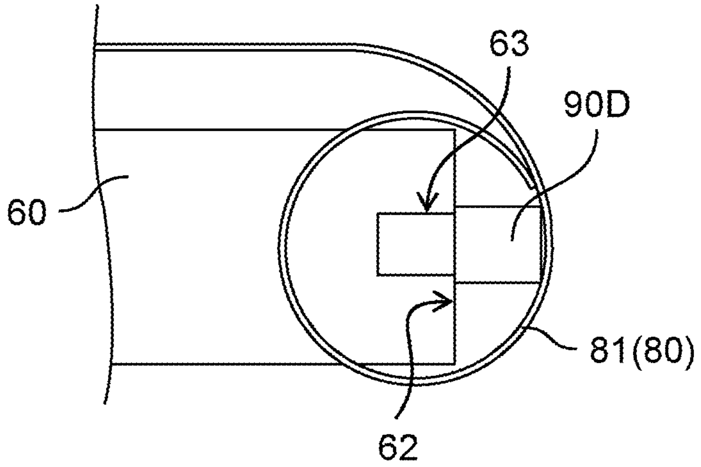
FIG. 17 is a diagram illustrating configurations of a brush, a constant load spring, and a pressing member in an electric motor according to Modification 2.

In the first to third exemplary embodiments, the sectional shape of pressing member 90 at the contact portion with rear end surface 62 of brush 60 is circular. However, the present disclosure is not limited thereto. FIG. 17 is a diagram illustrating configurations of brush 60, constant load spring 80, and pressing member 90D in an electric motor according to Modification 2. For example, as illustrated in FIG. 17, the sectional shape of pressing member 90D at the contact portion with rear end surface 62 of brush 60 may be rectangular. In this case, pressing member 90 and rear end surface 62 of brush 60C are not in point contact but in surface contact. The sectional shape of pressing member 90D is, for example, rectangular. However, the sectional shape of pressing member 90D may be a rhombus or the like.

In FIG. 17, pressing member 90D and first spiral portion 81 do not come into contact with each other at one point but come into contact with each other at two points. Thus, in the present modification, frictional resistance between pressing member 90D and first spiral portion 81 increases as compared with the first to third exemplary embodiments, and there is a possibility that the slidability of constant load spring 80 is slightly inferior.

Figure 18:
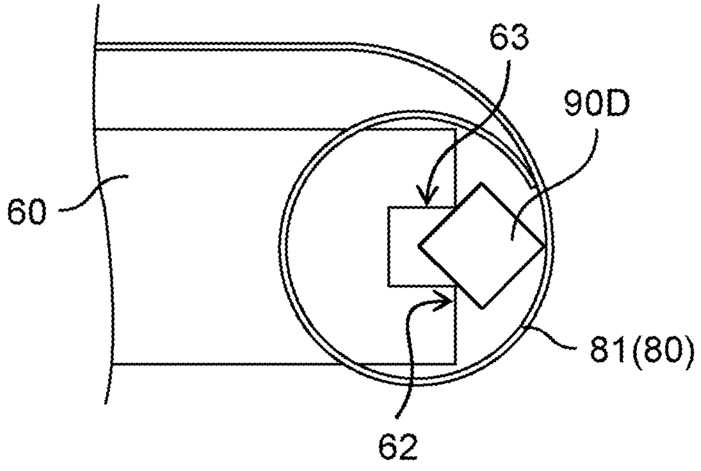
FIG. 18 is a diagram illustrating configurations of a brush, a constant load spring, and a pressing member in an electric motor according to Modification 3.

FIG. 18 is a diagram illustrating configurations of brush 60, constant load spring 80, and pressing member 90D in an electric motor according to Modification 3. In a case where pressing member 90D having a rectangular sectional shape is used, as illustrated in FIG. 18, pressing member 90D may abut on recess 63 of brush 60 such that only one corner of pressing member 90D abuts on first spiral portion 81. As a result, since pressing member 90D and first spiral portion 81 come into contact with each other at one point, the frictional resistance between pressing member 90D and first spiral portion 81 can be reduced. Thus, the slidability of constant load spring 80 can be improved. In FIG. 18, pressing member 90D and rear end surface 62 of brush 60 come into contact with each other at two points. As a result, it is also possible to prevent pressing member 90D from shaking when brush 60 slides.

Figure 19:
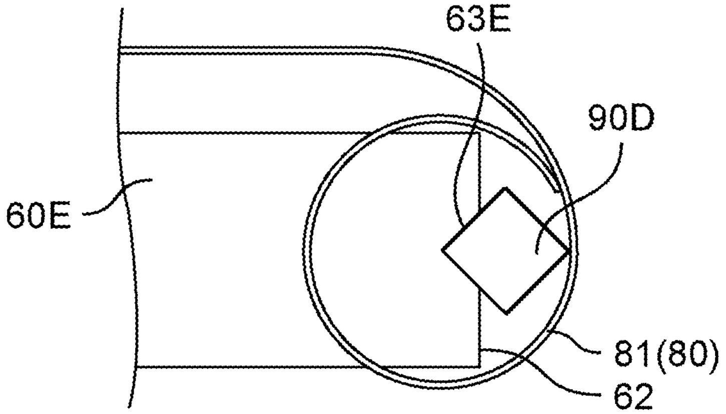
FIG. 19 is a diagram illustrating configurations of a brush, a constant load spring, and a pressing member in an electric motor according to Modification 4.

FIG. 19 is a diagram illustrating configurations of brush 60E, constant load spring 80, and pressing member 90D in an electric motor according to Modification 4. In a case where pressing member 90D having a rectangular sectional shape is used, as illustrated in FIG. 19, a shape of recess 63E formed on rear end surface 62 of brush 60E may be a triangle instead of a rectangle. As a result, pressing member 90D can be fitted into recess 63E. Therefore, it is possible to further prevent pressing member 90D from shaking when brush 60E slides.

Figure 20:
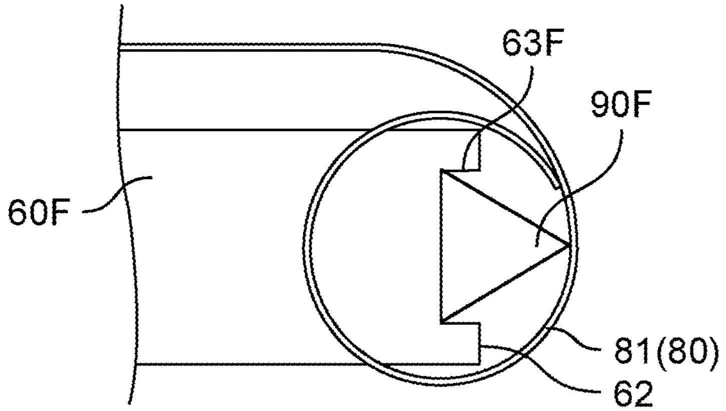
FIG. 20 is a diagram illustrating configurations of a brush, a constant load spring, and a pressing member in an electric motor according to Modification 5.
Figure 21:
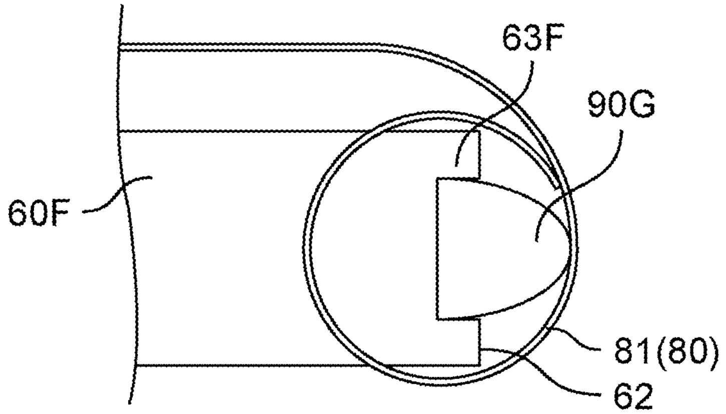
FIG. 21 is a diagram illustrating configurations of a brush, a constant load spring, and a pressing member in an electric motor according to Modification 6.

FIG. 20 is a diagram illustrating configurations of brush 60F, constant load spring 80, and pressing member 90F in an electric motor according to Modification 5. As illustrated in FIG. 20, pressing member 90F having a triangular sectional shape may be used. In this case, recess 63F formed on rear end surface 62 of brush 60F may be formed such that one side of pressing member 90F is in surface contact. FIG. 21 is a diagram illustrating configurations of brush 60F, constant load spring 80, and pressing member 90G in an electric motor according to Modification 6. In this case, as illustrated in FIG. 21, pressing member 90G having an arc in a sectional shape may be used.

Figure 22:
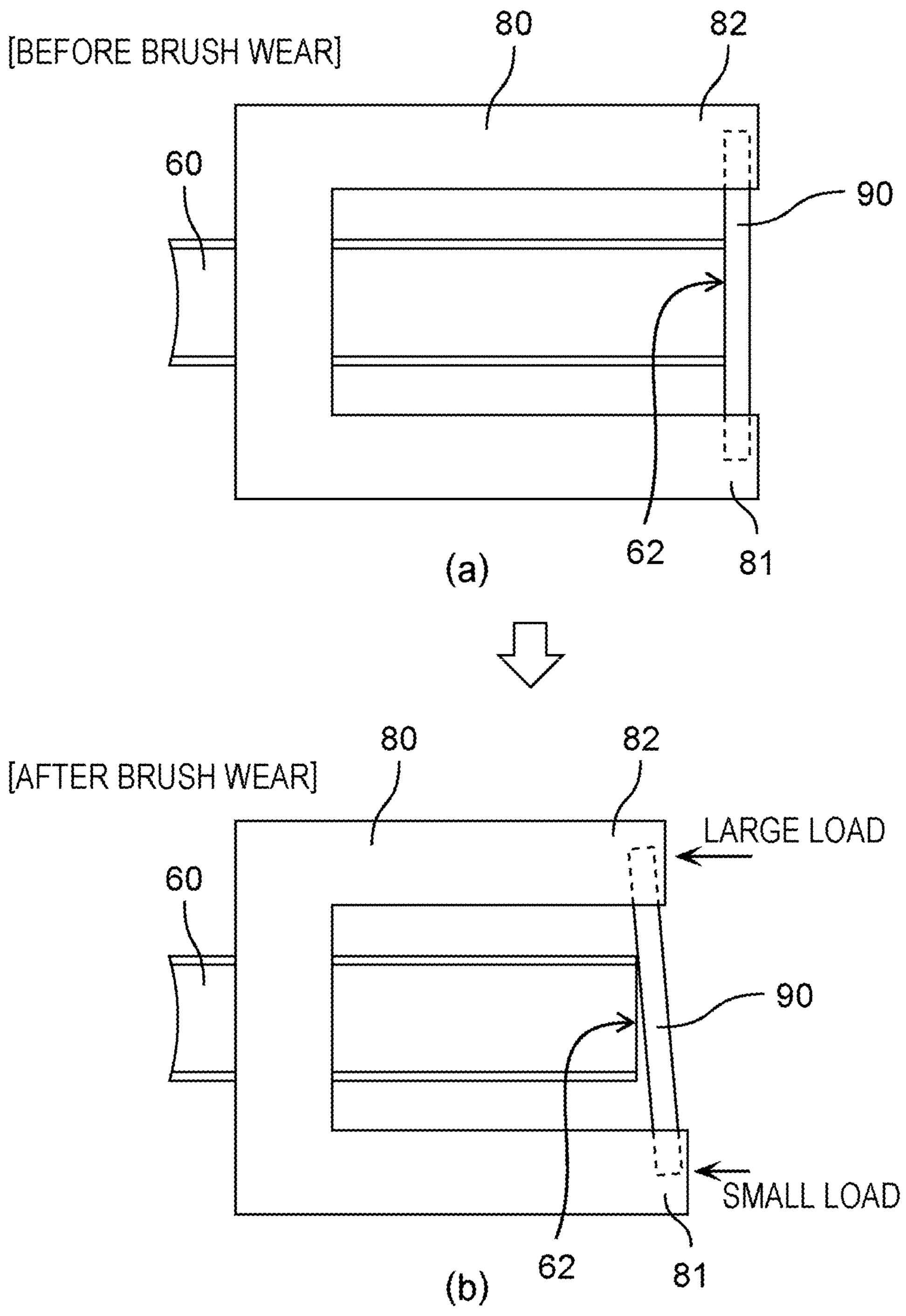
FIG. 22 is a diagram illustrating a scene in which the pressing member is inclined with respect to the brush due to a load difference between a first spiral portion and a second spiral portion in the constant load spring in the electric motor according to the first exemplary embodiment.

In constant load spring 80 according to the first exemplary embodiment, the load applied from first spiral portion 81 to brush 60 via pressing member 90 and the load applied from second spiral portion 82 to brush 60 via pressing member 90 are basically the same. However, the load of first spiral portion 81 and the load of second spiral portion 82 may vary due to a manufacturing error or the like. In this case, a load difference between first spiral portion 81 and second spiral portion 82 may cause pressing member 90 to be inclined as brush 60 slides. FIG. 22 is a diagram illustrating a scene in which pressing member 90 is inclined with respect to the brush due to the load difference between first spiral portion 81 and second spiral portion 82 in constant load spring 80 in the electric motor according to the first exemplary embodiment. For example, as illustrated in FIG. 22, in a case where the load of second spiral portion 82 is larger than the load of first spiral portion 81, when initial state (a) before brush 60 is worn is changed to state (b) in which brush 60 is worn, pressing member 90 is inclined with respect to fall toward second spiral portion 82 having the larger load. In this case, the load of constant load spring 80 via pressing member 90 is concentrated at one point on a corner of an end edge of rear end surface 62 of brush 60. As a result, brush 60 pressed by pressing member 90 is inclined, and the slidability of brush 60 may deteriorates.

Figure 23:
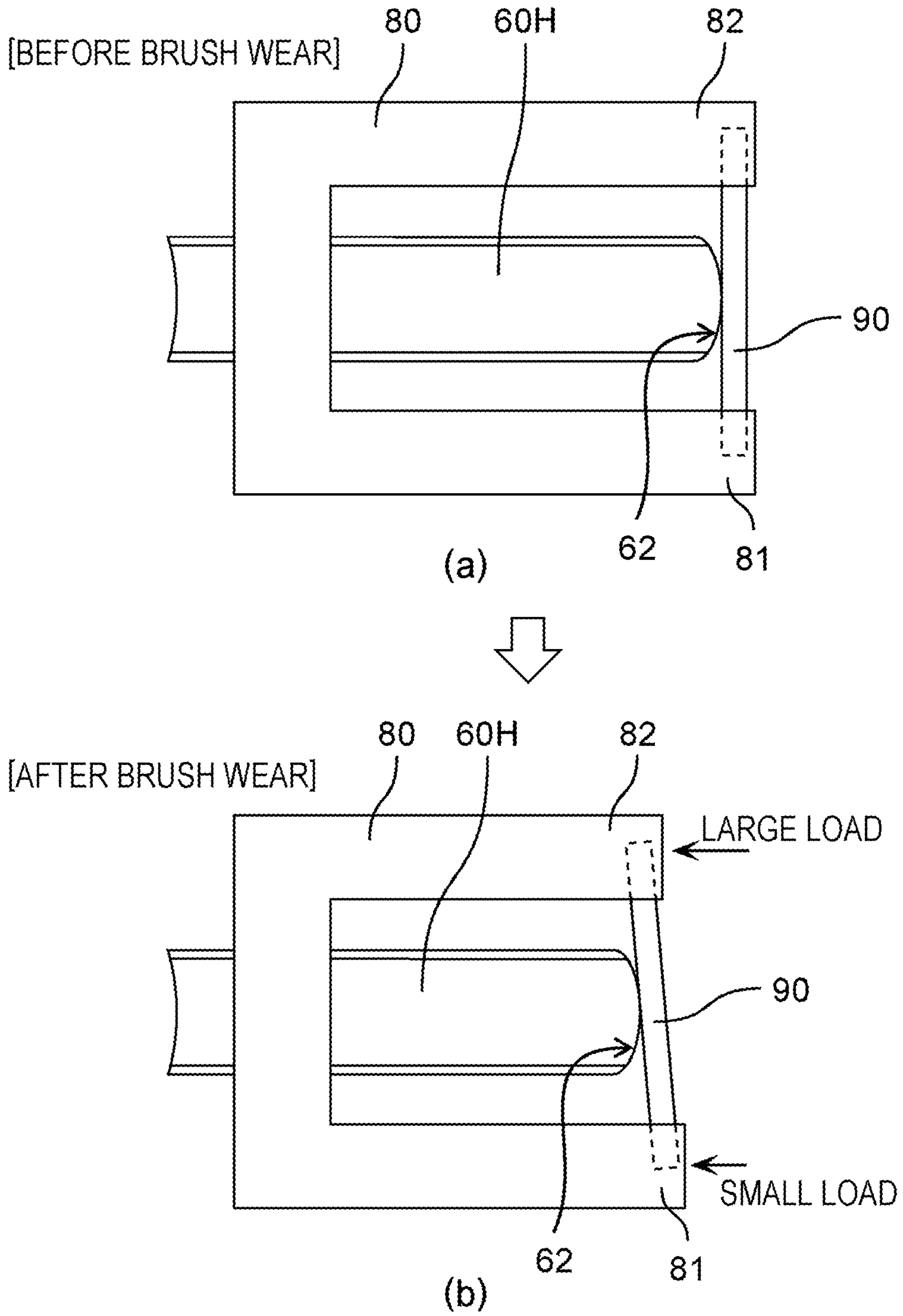
FIG. 23 is a view illustrating a scene in which a pressing member is inclined with respect to a brush due to a load difference between a first spiral portion and a second spiral portion in a constant load spring in an electric motor according to Modification 7.

FIG. 23 is a diagram illustrating a scene in which pressing member 90 is inclined with respect to brush 60H due to the load difference between first spiral portion 81 and second spiral portion 82 in the constant load spring in an electric motor according to Modification 7. As illustrated in FIG. 23, brush 60H in which rear end surface 62 includes an arc shape in top view may be used. As a result, even though there is the load difference between first spiral portion 81 and second spiral portion 82 and pressing member 90 is inclined as brush 60H slides, it is possible to suppress the inclination of brush 60H. Specifically, as illustrated in FIG. 23, in a case where the load of second spiral portion 82 is larger than the load of first spiral portion 81, pressing member 90 is inclined with respect to fall toward second spiral portion 82 having the larger load when initial state (a) before brush 60H is worn is changed to state (b) in which brush 60H is worn. However, the load of constant load spring 80 via pressing member 90 is concentrated not on the end edge of rear end surface 62 of brush 60H but on a center of the end edge of rear end surface 62. As a result, brush 60H pressed by pressing member 90 can be prevented from being inclined. Therefore, it is possible to suppress deterioration in the slidability of brush 60 H.

In the first to third exemplary embodiments, constant load spring 80 is arranged in a posture (horizontal posture) in which a direction in which first spiral portion 81 and second spiral portion 82 are arranged is parallel to an XY plane. However, the present disclosure is not limited thereto. Specifically, constant load spring 80 may be arranged in a posture (vertical posture) in which a direction in which first spiral portion 81 and second spiral portion 82 are arranged is parallel to a Z-axis direction.

In the above exemplary embodiment, stator 20 includes magnet 21. However, the present disclosure is not limited thereto. For example, stator 20 may include a stator core and a winding coil wound around the stator core.

In the above exemplary embodiment, a case where electric air blower 1 is used for a vacuum cleaner has been described. However, the present disclosure is not limited thereto. For example, electric air blower 1 may be used for a hand dryer and the like.

In the above exemplary embodiment, an example in which electric motor 2 is used for electric air blower 1 has been described. However, the present disclosure is not limited thereto, and electric motor 2 may be used for electric equipment other than electric air blower 1. Not limited to a case of use for home electric equipment, electric motor 2 may be used for industrial equipment.

The present disclosure also includes an aspect obtained by applying various modifications conceived by those skilled in the art to the exemplary embodiments above, or an aspect achieved by appropriately combining components and functions in the exemplary embodiments within a range without departing from the gist of the present disclosure.

The electric motor, the electric air blower, and the like of the present disclosure can be used in various electric equipment including home electric equipment such as a vacuum cleaner.

The invention claimed is:

1. An electric motor comprising:

a rotor including a rotating shaft extending in an axial direction;

a commutator attached to the rotating shaft;

a brush including a front end surface coming into contact with the commutator and a rear end surface positioned on a side opposite to the front end surface;

a constant load spring having a first spiral portion and a second spiral portion each made of a strip-shaped wire material wound in a spiral shape, the constant load spring including a fixed end disposed on a front end surface side of the brush; and a pressing member coming into contact with the rear end surface of the brush to press the brush against the commutator with a load from the constant load spring, wherein:

the pressing member includes a first end and a second end that each protrude from the rear end surface of the brush when the brush is viewed from the axis in a direction opposite to a direction in which the brush is pressed against the commutator by the load from the constant load spring, and the brush is pressed against the commutator by a load generated when the strip-shaped wire material drawn out from the first spiral portion of the constant load spring returns to an original state is applied to the first end of the pressing member and a load generated when the strip-shaped wire material drawn out from the second spiral portion of the constant load spring returns to an original state is applied to the second end of the pressing member.

2. The electric motor according to claim 1, wherein the first end comes into contact with an inner surface of the first spiral portion of the constant load spring and the second end comes into contact with an inner surface of the second spiral portion of the constant load spring.

3. The electric motor according to claim 1, wherein the first end comes into contact with an outer surface of the first spiral portion of the constant load spring on a fixed end side of the constant load spring and the second end comes into contact with an outer surface of the second spiral portion of the constant load spring on the fixed end side of the constant load spring.

4. The electric motor according to claim 1, wherein each of the first spiral portion and the second spiral portion of the constant load spring comes into contact with the pressing member at one point in a section taken along a plane passing through an axis of the rotating shaft.

5. The electric motor according to claim 4, wherein a sectional shape of the pressing member is circular at a contact portion between the pressing member and each of the first spiral portion and the second spiral portion of the constant load spring.

6. The electric motor according to claim 1, wherein the rear end surface of the brush comes into contact with the pressing member at two points in a section taken along a plane passing through an axis of the rotating shaft.

7. The electric motor according to claim 6, wherein a recess is formed at a contact portion of the rear end surface of the brush with the pressing member, and the two points are contact portions between the pressing member and an opening end edge of the recess in the section taken along the plane passing through the axis of the rotating shaft.

8. The electric motor according to claim 1, further comprising a brush holder including a brush accommodation portion that accommodates the brush, a first slit extending along a longitudinal direction of the brush and located on one side surface of the brush accommodation portion, and a second slit extending along the longitudinal direction of the brush and located on an other side surface of the brush accommodation portion, wherein the first end of the pressing member protrudes from the first slit of the brush accommodation portion and the second end of the pressing member protrudes from the second slit of the brush accommodation portion.

9. The electric motor according to claim 8, wherein the first spiral portion and the second spiral portion of the constant load spring are arranged to sandwich the brush accommodation portion.

10. The electric motor according to claim 8, wherein the fixed end of the constant load spring comprises a coupling portion in which the strip-shaped wire material forming the first spiral portion and the strip-shaped wire material forming the second spiral portion are coupled.

11. The electric motor according to claim 10, wherein the coupling portion of the constant load spring is fixed to the brush holder.

12. The electric motor according to claim 1, wherein the pressing member is a rod-shaped member including a linear elongated shape, the first end of the pressing member is one end of the rod-shaped member in a longitudinal direction, and the second end of the pressing member is an other end of the rod-shaped member in the longitudinal direction.

13. The electric motor according to claim 1, wherein the pressing member includes:

a rod-shaped portion that includes a linear elongated shape, comes into contact with the rear end surface of the brush, and protrudes from the rear end surface, a first extending portion that extends from one end of the rod-shaped portion toward the commutator, and a second extending portion that extends from an other end of the rod-shaped portion toward the commutator, the first end of the pressing member is an end of the first extending portion, and the second end of the pressing member is an end of the second extending portion.

14. The electric motor according to claim 1, wherein the rear end surface of the brush includes an arc shape when the brush is viewed from above.

15. The electric motor according to claim 1, wherein the pressing member includes:

a rod-shaped member including a linear elongated shape, a first fall-off prevention portion disposed at one end of the rod-shaped member and having a larger diameter than the rod-shaped member, and a second fall-off prevention portion disposed at another end of the rod-shaped member and having a larger diameter than the rod-shaped member.

16. The electric motor according to claim 1, wherein the first spiral portion and the second spiral portion are located on a rear end side of the brush.

* * * * *